(12) United States Patent
Chong et al.

(10) Patent No.: US 10,485,047 B2
(45) Date of Patent: Nov. 19, 2019

(54) SERVICE PROCESSING METHOD AND APPARATUS

(71) Applicant: HUAWEI TECHNOLOGIES CO., LTD., Shenzhen, Guangdong (CN)

(72) Inventors: Weiwei Chong, Shanghai (CN); Xiaobo Wu, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/933,976

(22) Filed: Mar. 23, 2018

(65) Prior Publication Data

US 2018/0213586 A1    Jul. 26, 2018

Related U.S. Application Data

(63) Continuation of application No. PCT/CN2015/090843, filed on Sep. 25, 2015.

(51) Int. Cl.
*H04W 4/00*   (2018.01)
*H04W 76/15*   (2018.01)
(Continued)

(52) U.S. Cl.
CPC ....... *H04W 76/15* (2018.02); *H04W 36/0022* (2013.01); *H04W 48/06* (2013.01);
(Continued)

(58) Field of Classification Search
None
See application file for complete search history.

(56) References Cited

U.S. PATENT DOCUMENTS 7,002,919 B1    2/2006  El-Sayed
8,929,319 B2*   1/2015  Anderson ......... H04W 72/1284
                                                370/329
(Continued)

FOREIGN PATENT DOCUMENTS

CN    101296514 A   10/2008
CN    101400049 A    4/2009
(Continued)

OTHER PUBLICATIONS

XP050996302 3GPP TS 36.321 V12.7.0 (Mar. 2015),3rd Generation Partnership Project;Technical Specification Group Radio Access Network;Evolved Universal Terrestrial Radio Access (E-UTRA);Medium Access Control (MAC) protocol specification(Release 12),total 78 pages.
(Continued)

*Primary Examiner* — Farah Faroul
(74) *Attorney, Agent, or Firm* — Womble Bond Dickinson (US) LLP

(57) ABSTRACT

A service processing method and an apparatus are provided. The method may include receiving, by an access network device, a connection setup message sent by user equipment (UE), where the connection setup message includes first voice session indication information that indicates that the connection setup message is sent due to a Voice over Long Term Evolution (VoLTE) voice session. The method may also include preferentially allocating, by the access network device within a first time period that is after the access network device receives the connection setup message, an uplink transmission resource to the UE if receiving a resource scheduling request message sent by the UE.

19 Claims, 13 Drawing Sheets

User equipment UE sends a connection setup message to an access network device, where the connection setup message includes first voice session indication information, and the first voice session indication information is used to indicate that the connection setup message is sent due to a Voice over Long Term Evolution VoLTE voice session — S301

The UE sends a resource scheduling request message to the access network device, and transmits an uplink data packet according to an uplink transmission resource allocated by the access network device, where the uplink transmission resource is preferentially allocated by the access network device to the UE within a first time period that is after the access network device receives the connection setup message sent by the UE — S302

(51) Int. Cl.
*H04W 72/10* (2009.01)
*H04W 76/18* (2018.01)
*H04W 36/00* (2009.01)
*H04W 48/06* (2009.01)
*H04W 48/16* (2009.01)
*H04W 76/10* (2018.01)
*H04W 28/02* (2009.01)
*H04W 76/12* (2018.01)

(52) U.S. Cl.
CPC .......... *H04W 48/16* (2013.01); *H04W 72/10* (2013.01); *H04W 76/18* (2018.02); *H04W 28/0231* (2013.01); *H04W 28/0278* (2013.01); *H04W 76/10* (2018.02); *H04W 76/12* (2018.02)

(56) References Cited

U.S. PATENT DOCUMENTS

| | | |
|---|---|---|
| 2002/0150082 A1 | 10/2002 | Celi et al. |
| 2008/0268859 A1 | 10/2008 | Lee et al. |
| 2009/0268635 A1 | 10/2009 | Gallagher et al. |
| 2013/0083749 A1* | 4/2013 | Xu .................... H04W 74/0833 370/329 |
| 2013/0114573 A1* | 5/2013 | Suzuki ................ H04L 1/1887 370/336 |
| 2013/0308620 A1 | 11/2013 | Bharadwaj |
| 2014/0135027 A1* | 5/2014 | Kodali .............. H04W 72/1278 455/452.1 |
| 2015/0003391 A1* | 1/2015 | Chen .................... H04L 5/0092 370/329 |
| 2015/0016420 A1* | 1/2015 | Balabhadruni ... H04W 36/0022 370/331 |
| 2015/0230199 A1 | 8/2015 | Jeong et al. |
| 2015/0264677 A1* | 9/2015 | He ....................... H04W 72/02 370/312 |
| 2015/0351028 A1* | 12/2015 | Vallath ............. H04W 52/0209 370/311 |
| 2016/0219644 A1* | 7/2016 | Zhao .................... H04W 76/12 |
| 2016/0234744 A1 | 8/2016 | Wu et al. |
| 2016/0360556 A1 | 12/2016 | Jeong et al. |
| 2017/0006625 A1 | 1/2017 | Lee et al. |
| 2017/0019934 A1* | 1/2017 | Yang ................... H04L 61/1529 |
| 2017/0027018 A1* | 1/2017 | Langereis ........... H04W 72/042 |
| 2017/0142706 A1 | 5/2017 | Kim et al. |
| 2018/0255594 A1* | 9/2018 | Liang ................... H04W 76/12 |

FOREIGN PATENT DOCUMENTS

| | | |
|---|---|---|
| CN | 101453719 A | 6/2009 |
| CN | 102625459 A | 8/2012 |
| CN | 102711063 A | 10/2012 |
| CN | 103475458 A | 12/2013 |
| CN | 104396212 A | 3/2015 |
| CN | 104737613 A | 6/2015 |
| CN | 104798421 A | 7/2015 |
| CN | 104823512 A | 8/2015 |
| CN | 104871603 A | 8/2015 |
| WO | 2008137486 A1 | 11/2008 |
| WO | 2015/058393 A1 | 4/2015 |

OTHER PUBLICATIONS

XP050996305 3GPP TS 36.331 V12.7.0 (Sep. 2015),3rd Generation Partnership Project;Technical Specification Group Radio Access Network;Evolved Universal Terrestrial Radio Access (E-UTRA);Radio Resource Control (RRC);Protocol specification(Release 12),total 454 pages.

XP051003983 R2-153213 Nokia Networks et al.,"Establishment Cause for VoLTE calls",3GPP TSG-RAN WG2 Meeting #91,Beijing, China, Aug. 24-28, 2015,total 4 pages.

* cited by examiner

SERVICE PROCESSING METHOD AND APPARATUS

CROSS-REFERENCE TO RELATED APPLICATIONS

This application is a continuation of International Patent Application No. PCT/CN2015/090843 filed on Sep. 25, 2015. The disclosure of the aforementioned application is hereby incorporated by reference in the entity.

TECHNICAL FIELD

This disclosure relates to the field of communications technologies, and in particular, to a service processing method and an apparatus.

BACKGROUND

A voice service in a Long Term Evolution (LTE) network is referred to as Voice over Long Term Evolution (VoLTE). Currently, more operators start to use VoLTE commercially, and more user terminals can support the VoLTE service. VoLTE is a voice technology based on IP (Internet Protocol) data transmission, and all services are carried in an LTE network. In this way, data and voice services can be carried in the same network.

The LTE network is an all-IP network. Like a data service, a voice service in the LTE network is carried on an IP-based bearer. VoLTE voice session signaling is transmitted between an IMS Internet Protocol multimedia subsystem (IMS) network and user equipment by using a bearer (a value of quality of service class identifier QCI (quality of service class identifier) of the bearer is usually 5), and some other services may also be transmitted between the IMS network and the user equipment by using the bearer, for example, an SMS short message service) service and an RCS (Rich Communication Suite) service.

The prior art has the following disadvantage: when network resources are limited, a setup delay of an existing VoLTE voice session is increased.

SUMMARY

This application provides a service processing method and an apparatus, to reduce a delay of a VoLTE voice session.

According to a first aspect of an embodiment of the present invention, a service processing method is provided, where the method includes:

receiving, by an access network device, a connection setup message sent by user equipment UE, where the connection setup message includes first voice session indication information that indicates that the connection setup message is sent due to a Voice over Long Term Evolution VoLTE voice session; and preferentially allocating, by the access network device within a first time period that is after the access network device receives the connection setup request message, an uplink transmission resource to the UE if receiving a resource scheduling request message sent by the UE.

With reference to the first aspect, in a first possible embodiment of the first aspect, the first voice session indication information is originating voice session indication information that indicates that the connection setup message is sent due to an originating VoLTE voice session; or the first voice session indication information is a terminated voice session indication that indicates that the connection setup message is sent due to a terminated VoLTE voice session.

With reference to the first aspect or the first possible embodiment of the first aspect, in a second possible embodiment of the first aspect, the method further includes:

preferentially allocating, by the access network device within a second time period that is after the access network device receives the connection setup message, a downlink transmission resource if receiving a downlink data packet to be sent to the UE, and sending the downlink data packet to the UE by using the downlink transmission resource.

With reference to any one of the first aspect or the first or the second possible embodiment of the first aspect, in a third possible embodiment of the first aspect, the preferentially allocating, by the access network device within a first time period that is after the access network device receives the connection setup request message, an uplink transmission resource to the UE if receiving a resource scheduling request message sent by the UE, includes:

starting, by the access network device, a first timer after receiving the connection setup request message, where timing duration of the first timer is the first time period; and preferentially allocating, by the access network device before the first timer expires, the uplink transmission resource to the UE if receiving the resource scheduling request message sent by the UE.

With reference to the second possible embodiment of the first aspect or the third possible embodiment of the first aspect, in a fourth possible embodiment of the first aspect, the preferentially allocating, by the access network device within a second time period that is after the access network device receives the connection setup message, a downlink transmission resource if receiving a downlink data packet to be sent to the UE, includes:

starting, by the access network device, a second timer after receiving the connection setup request message, where timing duration of the second timer is the second time period; and preferentially allocating, by the access network device before the second timer expires, the downlink transmission resource if receiving the downlink data packet to be sent to the UE.

With reference to any one of the second possible embodiments of the first aspect to the fourth possible embodiments of the first aspect, in a fifth possible embodiment of the first aspect, before preferentially allocating a downlink transmission resource, the method further includes:

determining, by the access network device, that the downlink data packet is transmitted on a VoLTE voice signaling plane bearer, where the VoLTE voice signaling plane bearer is a bearer available for transmission of VoLTE voice session signaling.

With reference to the fifth possible embodiment of the first aspect, in a sixth possible embodiment of the first aspect, a value of a quality of service class identifier QCI of the VoLTE voice signaling plane bearer is 5.

With reference to any one of the first aspect or the first to the sixth possible embodiments of the first aspect, in a seventh possible embodiment of the first aspect, before the receiving, by an access network device, the connection setup message sent by the UE, the method further includes:

sending, by the access network device, a paging message to the UE, where the paging message includes second voice session indication information that indicates that the paging message is sent due to a terminated VoLTE voice session.

With reference to any one of the first aspect or the first to the seventh possible embodiments of the first aspect, in an eighth possible embodiment of the first aspect, the connection setup message includes one or more of the following:
an RRC connection setup request message; or
an RRC connection setup complete message.

With reference to any one of the first aspect or the first to the eighth possible embodiments of the first aspect, in a ninth possible embodiment of the first aspect, the resource scheduling request message includes one or more of the following:
a schedule request SR; or
a buffer status report BSR.

According to a second aspect of an embodiment of the present invention, a service processing method is provided, where the method includes:
sending, by user equipment UE, a connection setup message to an access network device, where the connection setup message includes first voice session indication information that indicates that the connection setup message is sent due to a Voice over Long Term Evolution VoLTE voice session; and
sending, by the UE, a resource scheduling request message to the access network device, and transmitting an uplink data packet according to an uplink transmission resource allocated by the access network device, where the uplink transmission resource is preferentially allocated by the access network device to the UE within a first time period that is after the access network device receives the connection setup message sent by the UE.

With reference to the second aspect, in a first possible embodiment of the second aspect, the sending, by user equipment UE, a connection setup message to an access network device, where the connection setup message includes first voice session indication information that indicates that the connection setup message is sent due to a VoLTE voice session, includes:
sending, by the UE, the connection setup message to the access network device, where the connection setup message includes originating voice session indication information that indicates that the connection setup message is sent due to the originating VoLTE voice session; or
sending, by the UE, the connection setup message to the access network device, where the connection setup message includes terminated voice session indication information that indicates that the connection setup message is sent due to the terminated VoLTE voice session.

With reference to the first possible embodiment of the second aspect, in a second possible embodiment of the second aspect, before the sending, by the UE, the connection setup message to the access network device, the method further includes:
receiving, by the UE, a paging message sent by the access network device; and
determining, by the UE, that the paging message includes second voice session indication information.

With reference to the second aspect or the first or the second possible embodiment of the second aspect, in a third possible embodiment of the second aspect, the connection setup message includes one or more of the following:
an RRC connection setup request message; or
an RRC connection setup complete message.

With reference to any one of the second aspect or the first to the third possible embodiments of the second aspect, in a fourth possible embodiment of the second aspect, the resource scheduling request message includes one or more of the following:
a schedule request SR; or
a buffer status report BSR.

According to a third aspect, a service processing method is provided, where the method includes:
receiving, by an access network device, a resource scheduling request message sent by user equipment UE, where the resource scheduling request message includes voice session indication information that indicates that the resource scheduling request message is sent due to a Voice over Long Term Evolution VoLTE voice session; and
preferentially allocating, by the access network device, an uplink transmission resource to the UE.

With reference to the third aspect, in a first possible embodiment of the third aspect, after the receiving, by an access network device, the resource scheduling request message, the method further includes:
preferentially allocating, by the access network device within a third time period that is after the access network device receives the resource scheduling request message, a downlink transmission resource if receiving a downlink data packet to be sent to the UE, and sending the downlink data packet to the UE by using the downlink transmission resource.

With reference to the first possible embodiment of the third aspect, in a second possible embodiment of the third aspect, the preferentially allocating, by the access network device within a third time period that is after the access network device receives the resource scheduling request message, a downlink transmission resource if receiving a downlink data packet to be sent to the UE, includes:
starting, by the access network device, a third timer after receiving the resource scheduling request message, where timing duration of the third timer is the third time period; and
preferentially allocating, by the access network device before the third timer expires, the downlink transmission resource if receiving the downlink data packet to be sent to the UE.

With reference to the second possible embodiment of the third aspect, in a third possible embodiment of the third aspect, before the preferentially allocating a downlink transmission resource, the method further includes:
determining, by the access network device, that the downlink data packet is transmitted on a VoLTE voice signaling plane bearer, where the VoLTE voice signaling plane bearer is a bearer available for transmission of VoLTE voice session signaling.

With reference to the third possible embodiment of the third aspect, in a fourth possible embodiment of the third aspect, a value of a quality of service class identifier QCI of the VoLTE voice signaling plane bearer is 5.

With reference to any one of the third aspect or the first to the third possible embodiments of the third aspect, in a fourth possible embodiment of the third aspect, the resource scheduling request message includes one or more of the following:
a schedule request SR; or
a buffer status report BSR.

According to a fourth aspect, a service processing method is provided, where the method includes:
sending, by user equipment UE, a resource scheduling request message to an access network device, where the resource scheduling request message includes voice session indication information that indicates that the resource scheduling request message is sent due to a Voice over Long Term Evolution VoLTE voice session; and transmitting, by the UE, an uplink data packet according to an uplink transmission resource allocated by the access network device, where the uplink transmission resource is preferentially allocated by the access network device to the UE after the access network device receives the resource scheduling request message sent by the UE.

With reference to the fourth aspect, in a first possible embodiment of the fourth aspect, the resource scheduling request message includes one or more of the following:

a schedule request SR; or a buffer status report BSR.

According to a fifth aspect, a service processing method is provided, where the method includes:

receiving, by an access network device, a first paging message that is used to page user equipment UE and that is sent by a core network control device, where the first paging message includes first voice session indication information that indicates that the first paging message is sent due to a Voice over Long Term Evolution VoLTE voice session; and preferentially sending, by the access network device, a second paging message to the UE, where the second paging message includes second voice session indication information that indicates that the second paging message is sent due to a VoLTE voice session.

With reference to the fifth aspect, in a first possible embodiment of the fifth aspect, after the sending, by the access network device, the second paging message to the UE, the method further includes:

preferentially processing, by the access network device, a connection setup message sent by the UE.

With reference to the fifth aspect or the first possible embodiment of the fifth aspect, in a second possible embodiment of the fifth aspect, the connection setup message includes one or more of the following:

an RRC connection setup request message; or an RRC connection setup complete message.

According to a sixth aspect of an embodiment of the present invention, a service processing method is provided, where the method includes:

receiving, by a core network control device, a downlink data notification message sent by a core network gateway device, where the downlink data notification message includes third voice session indication information that indicates that the downlink data notification message is sent due to a Voice over Long Term Evolution VoLTE voice session; and sending, by the core network control device, a first paging message to an access network device, where the first paging message includes first voice session indication information that indicates that the first paging message is initiated due to a VoLTE voice session.

With reference to the sixth aspect, in a first possible embodiment of the sixth aspect, the third voice session indication information is in any one of the following fields of the downlink data notification message:

a particular differentiated services code point DSCP, terms of service TOS, a traffic class Traffic Class, a flow label Flow Label, or a field of General Packet Radio Service GPRS Tunneling Protocol that carries the downlink data packet.

According to a seventh aspect of an embodiment of the present invention, a service processing apparatus is provided, where the apparatus includes:

a transceiver unit, configured to receive a connection setup message sent by user equipment UE, where the connection setup message includes first voice session indication information that indicates that the connection setup message is sent due to a Voice over Long Term Evolution VoLTE voice session; and an allocation unit, configured to preferentially allocate, within a first time period that is after the connection setup request message is received, an uplink transmission resource to the UE if a resource scheduling request message sent by the UE is received.

With reference to the seventh aspect, in a first possible embodiment of the seventh aspect, the first voice session indication information is originating voice session indication information that indicates that the connection setup message is sent due to an originating VoLTE voice session; or the first voice session indication information is a terminated voice session indication that indicates that the connection setup message is sent due to a terminated VoLTE voice session.

With reference to the seventh aspect or the first possible embodiment of the seventh aspect, in a second possible embodiment of the seventh aspect, the allocation unit is further configured to:

preferentially allocate, within a second time period that is after the connection setup message is received, a downlink transmission resource if the access network device receives a downlink data packet to be sent to the UE, and send the downlink data packet to the UE by using the downlink transmission resource.

With reference to any one of the seventh aspect or the first or the second possible embodiment of the seventh aspect, in a third possible embodiment of the seventh aspect, the allocation unit is specifically configured to:

start a first timer after the connection setup request message is received, where timing duration of the first timer is the first time period; and preferentially allocate, before the first timer expires, the uplink transmission resource to the UE if the resource scheduling request message sent by the UE is received.

With reference to the second possible embodiment of the seventh aspect or the third possible embodiment of the seventh aspect, in a fourth possible embodiment of the seventh aspect, the allocation unit is specifically configured to:

start a second timer after the connection setup request message is received, where timing duration of the second timer is the second time period; and preferentially allocate, before the second timer expires, the downlink transmission resource if the downlink data packet to be sent to the UE is received.

With reference to any one of the second possible embodiment of the seventh aspect to the fourth possible embodiment of the seventh aspect, in a fifth possible embodiment of the seventh aspect, the apparatus further includes a determining unit, where the determining unit is configured to:

determine that the downlink data packet is transmitted on a VoLTE voice signaling plane bearer, where the VoLTE voice signaling plane bearer is a bearer available for transmission of VoLTE voice session signaling.

With reference to the fifth possible embodiment of the seventh aspect, in a sixth possible embodiment of the seventh aspect, a value of a quality of service class identifier QCI of the VoLTE voice signaling plane bearer is 5.

With reference to any one of the seventh aspect or the first to the sixth possible embodiments of the seventh aspect, in a seventh possible embodiment of the seventh aspect, the transceiver unit is specifically configured to:

send a paging message to the UE, where the paging message includes second voice session indication information, and the second voice session indication information is that indicates that the paging message is sent due to a terminated VoLTE voice session.

With reference to any one of the seventh aspect or the first to the seventh possible embodiments of the seventh aspect, in an eighth possible embodiment of the seventh aspect, the connection setup message includes one or more of the following:

an RRC connection setup request message; or
an RRC connection setup complete message.

With reference to any one of the seventh aspect or the first to the eighth possible embodiments of the seventh aspect, in a ninth possible embodiment of the seventh aspect, the resource scheduling request message includes one or more of the following:

a schedule request SR; or
a buffer status report BSR.

According to an eighth aspect of an embodiment of the present invention, a service processing apparatus is provided, where the apparatus includes:

a sending unit, configured to send a connection setup message to an access network device, where the connection setup message includes first voice session indication information that indicates that the connection setup message is sent due to a Voice over Long Term Evolution VoLTE voice session; and the sending unit is configured to: send a resource scheduling request message to the access network device, and transmit an uplink data packet according to an uplink transmission resource allocated by the access network device, where the uplink transmission resource is preferentially allocated by the access network device to the UE within a first time period that is after the access network device receives the connection setup message sent by the UE.

With reference to the eighth aspect, in a first possible embodiment of the eighth aspect, the sending unit is specifically configured to:

send the connection setup message to the access network device if it is determined that an originating VoLTE voice session needs to be set up, where the connection setup message includes originating voice session indication information that indicates that the connection setup message is sent due to the originating VoLTE voice session; or send the connection setup message to the access network device if it is determined that a terminated VoLTE voice session needs to be set up, where the connection setup message includes terminated voice session indication information that indicates that the connection setup message is sent due to the terminated VoLTE voice session.

With reference to the first possible embodiment of the eighth aspect, in a second possible embodiment of the eighth aspect, the apparatus further includes a receiving unit, where the receiving unit is configured to:

receive a paging message sent by the access network device; and determine that the paging message includes second voice session indication information.

With reference to the eighth aspect or the first or the second possible embodiment of the eighth aspect, in a third possible embodiment of the eighth aspect, the connection setup message includes one or more of the following:

an RRC connection setup request message; or
an RRC connection setup complete message.

With reference to any one of the eighth aspect or the first to the third possible embodiments of the eighth aspect, in a fourth possible embodiment of the eighth aspect, the resource scheduling request message includes one or more of the following:

a schedule request SR; or
a buffer status report BSR.

According to a ninth aspect of an embodiment of the present invention, a service processing apparatus is provided, where the apparatus includes:

a transceiver unit, configured to receive a resource scheduling request message sent by user equipment UE, where the resource scheduling request message includes voice session indication information that indicates that the resource scheduling request message is sent due to a Voice over Long Term Evolution VoLTE voice session; and an allocation unit, configured to preferentially allocate an uplink transmission resource to the UE.

With reference to the ninth aspect, in a first possible embodiment of the ninth aspect, the allocation unit is further configured to:

preferentially allocate, within a third time period that is after the resource scheduling request message is received, a downlink transmission resource if a downlink data packet to be sent to the UE is received, and send the downlink data packet to the UE by using the downlink transmission resource.

With reference to the first possible embodiment of the ninth aspect, in a second possible embodiment of the ninth aspect, the allocation unit is specifically configured to:

start a third timer after the resource scheduling request message is received, where timing duration of the third timer is the third time period; and preferentially allocate, before the third timer expires, the downlink transmission resource if the downlink data packet to be sent to the UE is received.

With reference to the second possible embodiment of the ninth aspect, in a third possible embodiment of the ninth aspect, the transceiver unit is further configured to:

determine that the downlink data packet is transmitted on a VoLTE voice signaling plane bearer, where the VoLTE voice signaling plane bearer is a bearer available for transmission of VoLTE voice session signaling.

With reference to the third possible embodiment of the ninth aspect, in a fourth possible embodiment of the ninth aspect, a value of a quality of service class identifier QCI of the VoLTE voice signaling plane bearer is 5.

With reference to any one of the ninth aspect or the first to the third possible embodiments of the ninth aspect, in a fourth possible embodiment of the ninth aspect, the resource scheduling request message includes one or more of the following:

a schedule request SR; or
a buffer status report BSR.

According to a tenth aspect of an embodiment of the present invention, a service processing apparatus is provided, where the apparatus includes:

a sending unit, configured to send a resource scheduling request message to an access network device, where the resource scheduling request message includes voice session indication information that indicates that the resource scheduling request message is sent due to a Voice over Long Term Evolution VoLTE voice session; and the sending unit is configured to transmit an uplink data packet according to an uplink transmission resource allocated by the access network device, where the uplink transmission resource is preferentially allocated by the access network device to the apparatus after the access network device receives the resource scheduling request message sent by the apparatus.

With reference to the tenth aspect, in a first possible embodiment of the tenth aspect, the resource scheduling request message includes one or more of the following:
   a schedule request SR; or
   a buffer status report BSR.

According to an eleventh aspect of an embodiment of the present invention, a service processing apparatus is provided, where the apparatus includes:
   a receiving unit, configured to receive a first paging message that is used to page user equipment UE and that is sent by a core network control device, where the first paging message includes first voice session indication information that indicates that the first paging message is sent due to a Voice over Long Term Evolution VoLTE voice session; and
   a sending unit, configured to preferentially send a second paging message to the UE, where the second paging message includes second voice session indication information that indicates that the second paging message is sent due to a VoLTE voice session.

With reference to the eleventh aspect, in a first possible embodiment of the eleventh aspect, the sending unit is further configured to:
   preferentially process a connection setup message sent by the UE.

With reference to the eleventh aspect or the first possible embodiment of the eleventh aspect, in a second possible embodiment of the eleventh aspect, the connection setup message includes one or more of the following:
   an RRC connection setup request message; or
   an RRC connection setup complete message.

According to a twelfth aspect of an embodiment of the present invention, a service processing apparatus is provided, where the apparatus includes:
   a receiving unit, configured to receive a downlink data notification message sent by a core network gateway device, where the downlink data notification message includes third voice session indication information that indicates that the downlink data notification message is sent due to a Voice over Long Term Evolution VoLTE voice session; and
   a sending unit, configured to send a first paging message to an access network device, where the first paging message includes first voice session indication information that indicates that the first paging message is initiated due to a VoLTE voice session.

With reference to the twelfth aspect, in a first possible embodiment of the twelfth aspect, the third voice session indication information is in any one of the following fields of the downlink data notification message:
   a particular differentiated services code point DSCP, terms of service TOS, a traffic class Traffic Class, a flow label Flow Label, or a field of General Packet Radio Service GPRS Tunneling Protocol that carries the downlink data packet.

According to a thirteenth aspect of an embodiment of the present invention, an access network device is provided and includes:
   a transceiver, configured to receive a connection setup message sent by user equipment UE, where the connection setup message includes first voice session indication information that indicates that the connection setup message is sent due to a Voice over Long Term Evolution VoLTE voice session; and configured to receive a resource scheduling request message sent by the UE; and
   the processor, configured to preferentially allocate, within a first time period that is after the connection setup request message is received, an uplink transmission resource to the UE if the transceiver receives the resource scheduling request message sent by the UE.

With reference to the thirteenth aspect, in a first possible embodiment of the thirteenth aspect,
   the transceiver is configured to receive a downlink data packet to be sent to the UE;
   the processor is configured to preferentially allocate, within a second time period that is after the connection setup message is received, a downlink transmission resource if the transceiver receives the downlink data packet to be sent to the UE; and
   the processor is configured to send the downlink data packet to the UE by using the downlink transmission resource.

With reference to the thirteenth aspect or the first possible embodiment of the thirteenth aspect, in a second possible embodiment of the thirteenth aspect, the access network device further includes a first timer;
   the processor is configured to start the first timer after the connection setup request message is received, where timing duration of the first timer is the first time period; and
   the processor is configured to preferentially allocate, before the first timer expires, the uplink transmission resource to the UE if the transceiver receives the resource scheduling request message sent by the UE.

With reference to any one of the thirteenth aspect or the first or the second possible embodiment of the thirteenth aspect, in a third possible embodiment of the thirteenth aspect, the access network device further includes a second timer;
   the processor is configured to start the second timer after the connection setup request message is received, where timing duration of the second timer is the second time period; and
   the processor is configured to preferentially allocate, before the second timer expires, the downlink transmission resource if the transceiver receives the downlink data packet to be sent to the UE.

With reference to the second possible embodiment of the thirteenth aspect or the third possible embodiment of the thirteenth aspect, in a fourth possible embodiment of the thirteenth aspect, the processor is specifically configured to:
   determine that the downlink data packet is transmitted on a VoLTE voice signaling plane bearer, where the VoLTE voice signaling plane bearer is a bearer available for transmission of VoLTE voice session signaling.

With reference to any one of the thirteenth aspect or the first to the fourth possible embodiments of the thirteenth aspect, in a fifth possible embodiment of the thirteenth aspect, the transceiver is specifically configured to:
   send a paging message to the UE, where the paging message includes second voice session indication information that indicates that the paging message is sent due to a terminated VoLTE voice session.

According to a fourteenth aspect of an embodiment of the present invention, user equipment is provided and includes:
   a transceiver, configured to send a connection setup message to an access network device, where the connection setup message includes first voice session indication information that indicates that the connection setup message is sent due to a Voice over Long Term Evolution VoLTE voice session; where
   the transceiver is configured to: send a resource scheduling request message to the access network device, and transmit an uplink data packet according to an uplink transmission resource allocated by the access network device, where the uplink transmission resource is preferentially allocated by the access network device to the UE within a first time period that is after the access network device receives the connection setup message sent by the UE.

With reference to the fourteenth aspect, in a first possible embodiment of the fourteenth aspect, the user equipment further includes a processor, where the processor is configured to determine that an originating VoLTE voice session needs to be set up; and the transceiver is configured to send the connection setup message to the access network device, where the connection setup message includes originating voice session indication information that indicates that the connection setup message is sent due to the originating VoLTE voice session; or the processor is configured to determine that a terminated VoLTE voice session needs to be set up; and the transceiver is configured to send the connection setup message to the access network device, where the connection setup message includes terminated voice session indication information that indicates that the connection setup message is sent due to the terminated VoLTE voice session.

With reference to the first possible embodiment of the fourteenth aspect, in a second possible embodiment of the fourteenth aspect, the transceiver is configured to receive a paging message sent by the access network device; and the processor is configured to determine that the paging message includes second voice session indication information.

According to a fifteenth aspect of an embodiment of the present invention, an access network device is provided and includes:

a transceiver, configured to receive a resource scheduling request message sent by user equipment UE, where the resource scheduling request message includes voice session indication information that indicates that the resource scheduling request message is sent due to a Voice over Long Term Evolution VoLTE voice session; and a processor, configured to preferentially allocate an uplink transmission resource to the UE.

With reference to the fifteenth aspect, in a first possible embodiment of the fifteenth aspect, the transceiver is configured to receive a downlink data packet to be sent to the UE;

the processor is configured to preferentially allocate, within a third time period that is after the resource scheduling request message is received, a downlink transmission resource if the transceiver receives the downlink data packet to be sent to the UE; and the transceiver is configured to send the downlink data packet to the UE by using the downlink transmission resource.

With reference to the first possible embodiment of the fifteenth aspect, in a second possible embodiment of the fifteenth aspect, the user equipment further includes a third timer:

the processor is configured to start the third timer after the resource scheduling request message is received, where timing duration of the third timer is the third time period; and the processor is configured to preferentially allocate, before the third timer expires, the downlink transmission resource if the transceiver receives the downlink data packet to be sent to the UE.

With reference to the second possible embodiment of the fifteenth aspect, in a third possible embodiment of the fifteenth aspect, the processor is specifically configured to:

determine that the downlink data packet is transmitted on a VoLTE voice signaling plane bearer, where the VoLTE voice signaling plane bearer is a bearer available for transmission of VoLTE voice session signaling.

According to a sixteenth aspect of an embodiment of the present invention, user equipment is provided and the apparatus includes:

a transceiver, configured to send a resource scheduling request message to an access network device, where the resource scheduling request message includes voice session indication information that indicates that the resource scheduling request message is sent due to a Voice over Long Term Evolution VoLTE voice session; and a processor, configured to transmit an uplink data packet according to an uplink transmission resource allocated by the access network device, where the uplink transmission resource is preferentially allocated by the access network device to the UE after the access network device receives the resource scheduling request message sent by the UE.

According to a seventeenth aspect of an embodiment of the present invention, an access network device is provided and includes:

a transceiver, configured to receive a first paging message that is used to page user equipment UE and that is sent by a core network control device, where the first paging message includes first voice session indication information that indicates that the first paging message is sent due to a Voice over Long Term Evolution VoLTE voice session; where the transceiver is configured to preferentially send a second paging message to the UE, where the second paging message includes second voice session indication information that indicates that the second paging message is sent due to a VoLTE voice session.

With reference to the seventeenth aspect, in a first possible embodiment of the seventeenth aspect, the processor is specifically configured to:

preferentially process a connection setup message sent by the UE.

With reference to the seventeenth aspect or the first possible embodiment of the seventeenth aspect, in a second possible embodiment of the seventeenth aspect, the connection setup message includes one or more of the following:

an RRC connection setup request message; or an RRC connection setup complete message.

According to an eighteenth aspect of an embodiment of the present invention, a core network control device is provided and includes:

a transceiver, configured to receive a downlink data notification message sent by a core network gateway device, where the downlink data notification message includes third voice session indication information that indicates that the downlink data notification message is sent due to a Voice over Long Term Evolution VoLTE voice session; where the transceiver is configured to send a first paging message to an access network device, where the first paging message includes first voice session indication information that indicates that the first paging message is initiated due to a VoLTE voice session.

With reference to the eighteenth aspect, in a first possible embodiment of the eighteenth aspect, the third voice session indication information is in any one of the following fields of the downlink data notification message:

a particular differentiated services code point DSCP, terms of service TOS, a traffic class Traffic Class, a flow label Flow Label, or a field of General Packet Radio Service GPRS Tunneling Protocol that carries the downlink data packet.

According to the method and apparatus provided in this application, after determining that the received connection setup message includes the first voice session indication information, the access network device determines that the first voice session indication information in the connection setup message is generated in the connection setup message by the UE after the UE determines that the VoLTE voice session needs to be set up. The access network device preferentially allocates, within the first time period that is after the access network device receives the connection setup message, the uplink transmission resource to the UE according to the resource scheduling request message sent by the UE, to preferentially process a data packet related to the VoLTE voice session. This reduces a transmission delay of the data packet related to the VoLTE voice session, and ensures setup of the VoLTE voice session.

DESCRIPTION OF EMBODIMENTS

The following describes the embodiments of the present invention in detail with reference to the accompanying drawings of the specification.

Figure 1:
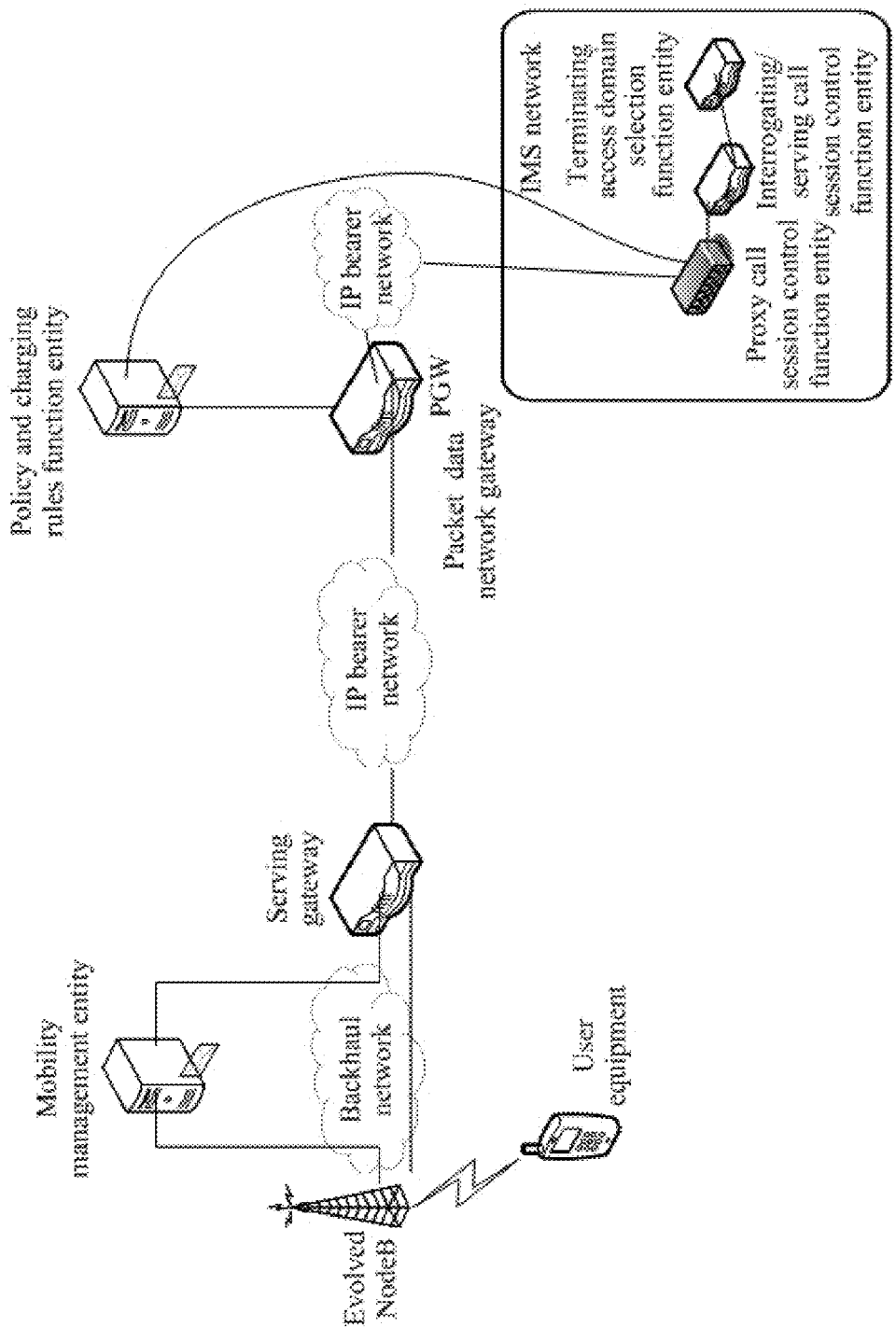
FIG. 1 is a schematic diagram of an architecture of a communications network according to an embodiment of the present invention.

Referring to FIG. 1, FIG. 1 is a schematic diagram of an architecture of a communications network according to an embodiment of the present invention. Usually, a communication connection between an evolved NodeB (eNB) and UE may be implemented by using a radio link. A base station is responsible for scheduling a resource for data transmission performed by UE, or the like. A core network control device in an LTE network with the architecture illustrated in FIG. 1 includes a mobility management entity (MME), a serving gateway (SGW), a packet data network gateway (P-GW), and the like, and may be responsible for connecting a VoLTE service of UE to an Internet Protocol multimedia subsystem (IMS) network and transferring signaling related to a VoLTE call between the UE and the IMS network and other IMS signaling.

In FIG. 1, a proxy call session control function (P-CSCF) entity, an interrogating/serving call session control function (I/S-CSCF) entity, a terminating access domain selection (T-ADS) function entity are further included. The P-CSCF (which may be classified into a P-CSCF corresponding to an originating party and a P-CSCF corresponding to terminating UE) is the first access point at which the UE accesses the IMS network in a VoLTE service process. The P-CSCF may be responsible for proxy of all VoLTE-related signaling and for implementing routing control. In a VoLTE call process, the P-CSCF may be further responsible for sending a related control message or the like to a PCRF (policy and charging rules function) entity.

The I/S-CSCF (which may be classified into an I/S-CSCF corresponding to an originating party and an I/S-CSCF corresponding to terminating UE) is a service switching center of the IMS network, and may be mainly responsible for receiving and processing of a registration request from UE, user management, session control, service switching, service control, SIP (Session Initiation Protocol) message processing, charging, and the like.

This embodiment of the present invention may be applied to a network such as an LTE network.

In this embodiment of the present invention, the user equipment may be a wireless terminal, or may be a wired terminal, and may be, for example, a mobile phone, a computer, a tablet computer, a personal digital assistant (PDA for short), a mobile Internet device (MID for short), a wearable device, or an e-book reader.

In this embodiment of the present invention, an access network device may be a device that communicates with a wireless terminal over an air interface in an access network by using one or more sectors or cells. The access network device may be a base station. When the access network device is a base station, the access network device may be an evolved NodeB in LTE. This is not limited in this embodiment of the present invention.

In this embodiment of the present invention, an IMS network device may be a P-CSCF.

In this embodiment of the present invention, the core network control device may be an MME.

In this embodiment of the present invention, a core network gateway device may be an SGW and/or a P-GW.

Figure 2:
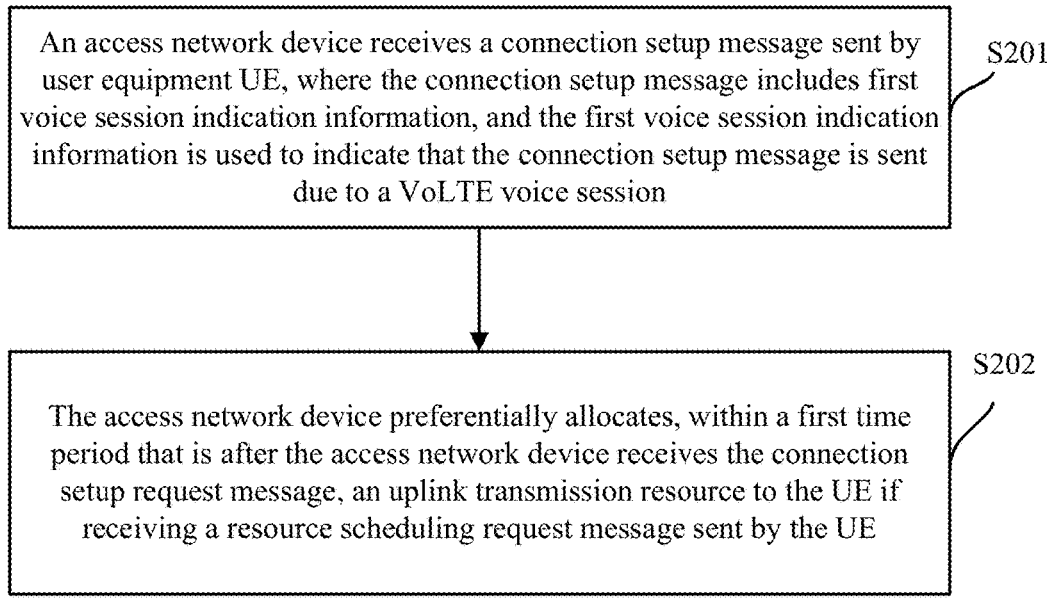
FIG. 2 is a schematic flowchart of a service processing method according to an embodiment of the present invention.

Based on the foregoing descriptions, as shown in FIG. 2, FIG. 2 is a schematic flowchart of a service processing method according to an embodiment of the present invention.

As shown in FIG. 2, an embodiment of the method includes the following steps.

S201. An access network device receives a connection setup message sent by user equipment UE, where the connection setup message includes first voice session indication information, and the first voice session indication information is used to indicate that the connection setup message is sent due to a VoLTE voice session.

The connection setup message that is sent by the UE and that is received by the access network device may be an RRC (radio resource control) connection setup request message, or may be an RRC connection setup complete message. This is not limited in this embodiment of the present invention.

The connection setup message received by the access network device may be sent by originating UE, or may be sent by terminating UE.

For example, when initiating an originating VoLTE voice session, idle-state UE needs to change from an idle state to a connected state; in this case, the UE first initiates an RRC connection setup request to a base station.

For example, after receiving a paging message that is initiated due to a VoLTE voice session and that is sent by the access network device, idle-state UE needs to change from an idle state to a connected state, and sets up a terminated VoLTE voice session; in this case, the UE first initiates an RRC connection setup request to a base station.

If the UE determines that an originating VoLTE voice session needs to be set up, the first voice session indication information may be specifically originating voice session indication information used to indicate that the connection setup message is sent due to the originating VoLTE voice session.

If the UE determines that a terminated VoLTE voice session needs to be set up, the first voice session indication information may be specifically a terminated voice session indication used to indicate that the connection setup message is sent due to a terminated VoLTE voice session.

If the UE determines that a terminated VoLTE voice session needs to be set up, the UE may further receive, before setting up the terminated VoLTE voice session, a paging message sent to the UE by the access network device or another access network device. The paging message includes second voice session indication information, and the second voice session indication information is used to indicate that the paging message is sent due to the terminated VoLTE voice session.

The second voice session indication information may be generated by the access network device, or may be generated by another network element device. For example, the second voice session indication information may be generated by any one of the following network element devices:

an IMS network device, a core network control device, or a core network gateway device.

For example, the second voice session indication information may be generated, after it is determined that downlink SIP signaling for a VoLTE voice session is received, by the IMS network device in a data packet in which the downlink SIP signaling is to be encapsulated. The IMS network device encapsulates the downlink SIP signaling in the data packet after receiving the downlink SIP signaling for the VoLTE voice session, and generates the first voice session indication information in the data packet. The data packet in which the IMS network device encapsulates the downlink SIP signaling for the VoLTE voice session is usually an IP data packet. In addition, the IMS network device encapsulates an IP address of terminating UE in a packet header of the IP data packet according to an IP address indicated when the terminating UE performs IMS registration.

For example, the second voice session indication information may be generated by the core network gateway device. After receiving a downlink data packet that includes voice session indication information generated by the IMS network device and that is sent by the IMS network device, the core network gateway device generates the second voice session indication information to replace the voice session indication information generated by the IMS network device. Certainly, alternatively, the core network gateway device may not generate the second voice session indication information, but directly use the received voice session indication information as the second voice session indication information, encapsulate the received voice session indication information in a downlink data packet, and transfer the downlink data packet to a next-hop node, for example, the core network control device.

For example, the second voice session indication information may be generated by the core network control device. After receiving a downlink data packet that includes voice session indication information generated by the core network gateway device and that is sent by the core network gateway device, the core network control device generates the second voice session indication information to replace the voice session indication information generated by the core network gateway device. Certainly, alternatively, the core network control device may not generate the second voice session indication information, but directly use the received voice session indication information as the second voice session indication information, encapsulate the received voice session indication information in a downlink data packet, and transfer the downlink data packet to a next-hop node, for example, the access network device.

S202. The access network device preferentially allocates, within a first time period that is after the access network device receives the connection setup request message, an uplink transmission resource to the UE if receiving a resource scheduling request message sent by the UE.

Specifically, the access network device starts a first timer after receiving the connection setup request message. Timing duration of the first timer is the first time period.

Before the first timer expires, if receiving the resource scheduling request message sent by the UE, the access network device preferentially allocates the uplink transmission resource to the UE according to the resource scheduling request message.

In an embodiment, the first time period may be set to maximum/average statistical duration required during setup of a VoLTE voice session. This can ensure that an uplink data packet sent by the UE is preferentially scheduled during setup of the VoLTE voice session.

The resource scheduling request message that is sent by the UE and that is received by the access network device may be a schedule request (SR for short), or may be a buffer status report (BSR for short).

When UE needs to transmit uplink data, the UE needs to first send an SR to the access network device to request the access network device to allocate the uplink transmission resource, so as to transmit the uplink data packet. Optionally, the UE further needs to send a BSR to the access network device, to inform the access network device of a data volume of a to-be-transmitted uplink data packet, so that the access network device schedules the uplink transmission resource for the UE according to the data volume of the to-be-transmitted uplink data packet. Therefore, the SR or BSR received by the access network device is sent by the UE to the access network device before the UE transmits uplink data.

It should be noted that a quantity of uplink transmission resources preferentially allocated, after the access network device receives the SR sent by the UE, by the access network device to the UE according to the SR may be a quantity of uplink transmission resources requested by the UE, or uplink transmission resources whose quantity is less than a quantity of uplink transmission resources requested by the UE may be allocated to the UE. If the quantity of uplink transmission resources allocated to the UE is less than the quantity of uplink transmission resources requested by the UE, subsequently, the access network device further needs to preferentially allocate sufficient uplink transmission resources to the UE according to the BSR sent by the UE.

After receiving the connection setup message that includes the first voice session indication information and that is sent by the UE, the access network device may further receive a downlink data packet to be sent to the UE. In a process in which the UE sets up a VoLTE voice session, to ensure that the access network device can process a data packet related to the VoLTE voice session in real time to ensure setup of the VoLTE voice session, the access network device needs to preferentially allocate a downlink transmission resource according to the downlink data packet to be sent to the UE, and send the downlink data packet to the UE by using the downlink transmission resource.

Further, the access network device may preferentially allocate, within a second time period that is after the access network device receives the connection setup message, the downlink transmission resource if receiving the downlink data packet to be sent to the UE, and send the downlink data packet to the UE by using the downlink transmission resource.

Specifically, the access network device starts a second timer after receiving the connection setup request message. Timing duration of the second timer is the second time period. The access network device preferentially allocates, before the second timer expires, the downlink transmission resource if receiving the downlink data packet to be sent to the UE, and sends the downlink data packet to the UE by using the downlink transmission resource.

In an embodiment, the second time period may be set to maximum/average statistical duration required during setup of a VoLTE voice session. This can ensure that an uplink data packet sent by the UE is preferentially scheduled during setup of the VoLTE voice session.

It should be noted that the duration of the first time period may be equal to the duration of the second time period or the duration of the first time period may be not equal to the duration of the second time period.

Optionally, the first timer and the second timer may be a same entity, or may be different entities.

It should be noted that the second time period may be set according to an actual case. This is not limited in this embodiment of the present invention.

An objective of preferentially scheduling, by the access network device, the downlink data packet to be sent to the UE is to preferentially schedule a downlink data packet that is related to the VoLTE voice session and that is to be sent to the UE. Therefore, the access network device may not need to preferentially schedule all downlink data packets that are to be sent to the UE. The downlink data packet related to the VoLTE voice session is usually transmitted on a VoLTE voice signaling plane bearer. Therefore, to reduce workload of the access network device, further, before preferentially allocating downlink transmission resources to all the downlink data packets to be sent to the UE, the access network device needs to determine that the downlink data packets are transmitted on the VoLTE voice signaling plane bearer. The VoLTE voice signaling plane bearer is a bearer available for transmission of VoLTE voice session signaling. Certainly, in addition to the VoLTE voice session signaling, the bearer may be used for transmission of another type of data. This is not limited herein. Specifically, after receiving the downlink data packets to be sent to the UE, the access network device first determines whether the downlink data packets to be sent to the UE are transmitted on the VoLTE voice signaling plane bearer; and if the downlink data packets to be sent to the UE are transmitted on the VoLTE voice signaling plane bearer and it is determined that the second timer does not expire, the access network device preferentially allocates the downlink transmission resources for the downlink data packets to be sent to the UE, and sends the downlink data packets to the UE by using the downlink transmission resources; or if determining that the downlink data packets to be sent to the UE are not transmitted on the VoLTE voice signaling plane bearer, the access network device may not preferentially allocate the downlink transmission resources.

Optionally, the downlink data packet is an IP data packet.

Further, a value of a QCI of the VoLTE voice signaling plane bearer is usually 5. Therefore, the access network device may preferentially schedule a downlink data packet transmitted on a bearer whose QCI value is 5, so as to reduce workload of the access network device. Specifically, after receiving the downlink data packet to be sent to the UE, the access network device first determines whether the downlink data packet to be sent to the UE is transmitted on the VoLTE voice signaling plane bearer whose QCI value is 5; and if the downlink data packet to be sent to the UE is transmitted on the VoLTE voice signaling plane bearer whose QCI value is 5 and it is determined that the second timer does not expire, the access network device preferentially allocates the downlink transmission resource for the downlink data packet to be sent to the UE, and sends the downlink data packet to the UE by using the downlink transmission resource; or if determining that the downlink data packet to be sent to the UE is not transmitted on the bearer whose QCI value is 5, the access network device may not preferentially allocate the downlink transmission resource.

According to the solution, the access network device can reduce impact on other UE as much as possible while preferentially scheduling the downlink data packet to be sent to the UE.

In the foregoing solution, after determining that the received connection setup message includes the first voice session indication information, the access network device determines that the first voice session indication information in the connection setup message is generated in the connection setup message by the UE after the UE determines that the originating VoLTE voice session or the terminated VoLTE voice session needs to be set up. The access network device preferentially allocates, within the first time period that is after the access network device receives the connection setup message, the uplink transmission resource to the UE according to the resource scheduling request message sent by the UE, and preferentially allocates, within the second time period that is after the access network device receives the connection setup message, the downlink transmission resource according to the downlink data packet to be sent to the UE, to preferentially process a data packet related to the VoLTE voice session. This can ensure that all uplink and downlink VoLTE voice session signaling of the UE are scheduled preferentially, and ensure setup of the VoLTE voice session.

Figure 3:
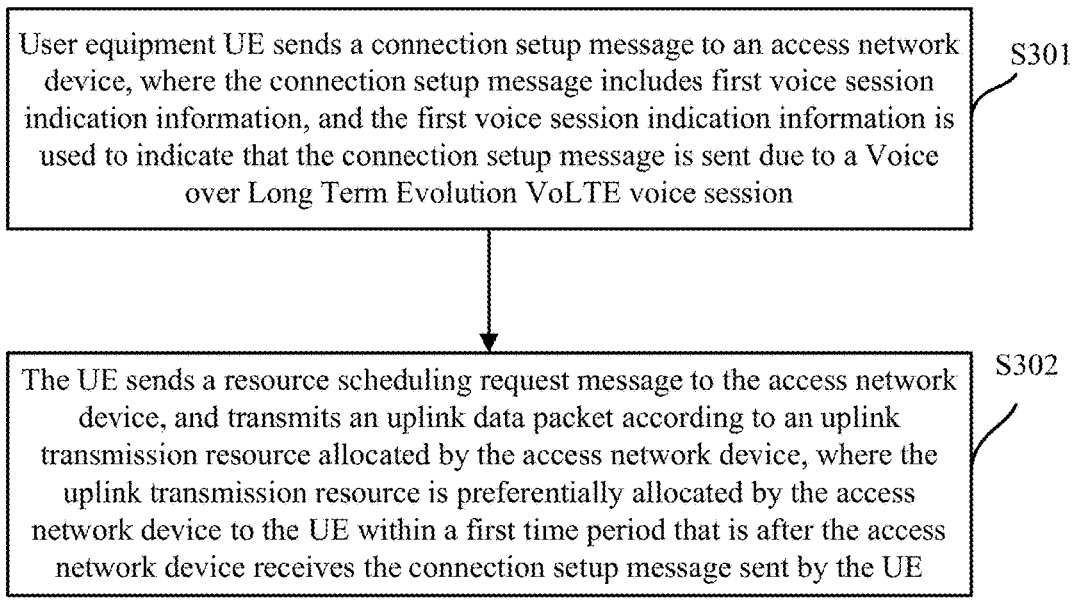
FIG. 3 is a schematic flowchart of a service processing method according to an embodiment of the present invention.

Based on the foregoing descriptions, as shown in FIG. 3, FIG. 3 is a schematic flowchart of a service processing method according to an embodiment of the present invention.

As shown in FIG. 3, an embodiment of the method includes the following steps.

S301. User equipment UE sends a connection setup message to an access network device, where the connection setup message includes first voice session indication information, and the first voice session indication information is used to indicate that the connection setup message is sent due to a Voice over Long Term Evolution VoLTE voice session.

Optionally, the UE is idle-state UE.

The connection setup message sent by the UE to the access network device may be an RRC connection setup request message, or may be an RRC connection setup complete message. This is not limited in this embodiment of the present invention.

Usually, the idle-state UE determines, in two cases, that a VoLTE voice session needs to be set up. The following provides detailed descriptions.

Case 1:

The UE determines that an originating VoLTE voice session needs to be set up. For example, the UE sends a connection setup message to the access network device if receiving an instruction used to instruct a user to make a VoLTE call. The connection setup message includes the first voice session indication information. In this case, the first voice session indication information may be specifically originating voice session indication information, and the originating voice session indication information is used to indicate that the connection setup message is sent due to the originating VoLTE voice session.

Case 2:

The UE sends a connection setup message to the access network device if determining that a terminated VoLTE voice session needs to be set up. The connection setup message includes the first voice session indication information. In this case, the first voice session indication information may be specifically terminated voice session indication information, and the terminated voice session indication information is used to indicate that the connection setup message is sent due to the terminated VoLTE voice session.

In case 2, the UE may determine, in the following manner, that the terminated VoLTE voice session needs to be set up:

receiving, by the UE, a paging message sent by the access network device or another access network device; and determining, by the UE, that the paging message is initiated due to the terminated VoLTE voice session if determining that the paging message includes second voice session indication information.

The second voice session indication information may be generated by the access network device, or may be generated by another network element device. For example, the second voice session indication information may be generated by any one of the following network element devices:

an IMS network device, a core network control device, or a core network gateway device.

Specifically, for a generation method of the second voice session indication information, refer to the descriptions in step S201, and details are not repeated herein.

S302. The UE sends a resource scheduling request message to the access network device, and transmits an uplink data packet according to an uplink transmission resource allocated by the access network device, where the uplink transmission resource is preferentially allocated by the access network device to the UE within a first time period that is after the access network device receives the connection setup message sent by the UE.

In an embodiment, the first time period may be set to maximum/average statistical duration required during setup of a VoLTE voice session. This can ensure that an uplink data packet sent by the UE is preferentially scheduled during setup of the VoLTE voice session.

The resource scheduling request message sent by the UE to the access network device may be an SR, or may be a BSR. This is not limited in this embodiment of the present invention.

For better understanding and implementation of the foregoing technical solution of this embodiment of the present invention, the following provides detailed descriptions with reference to some specific application scenarios.

Figure 4:
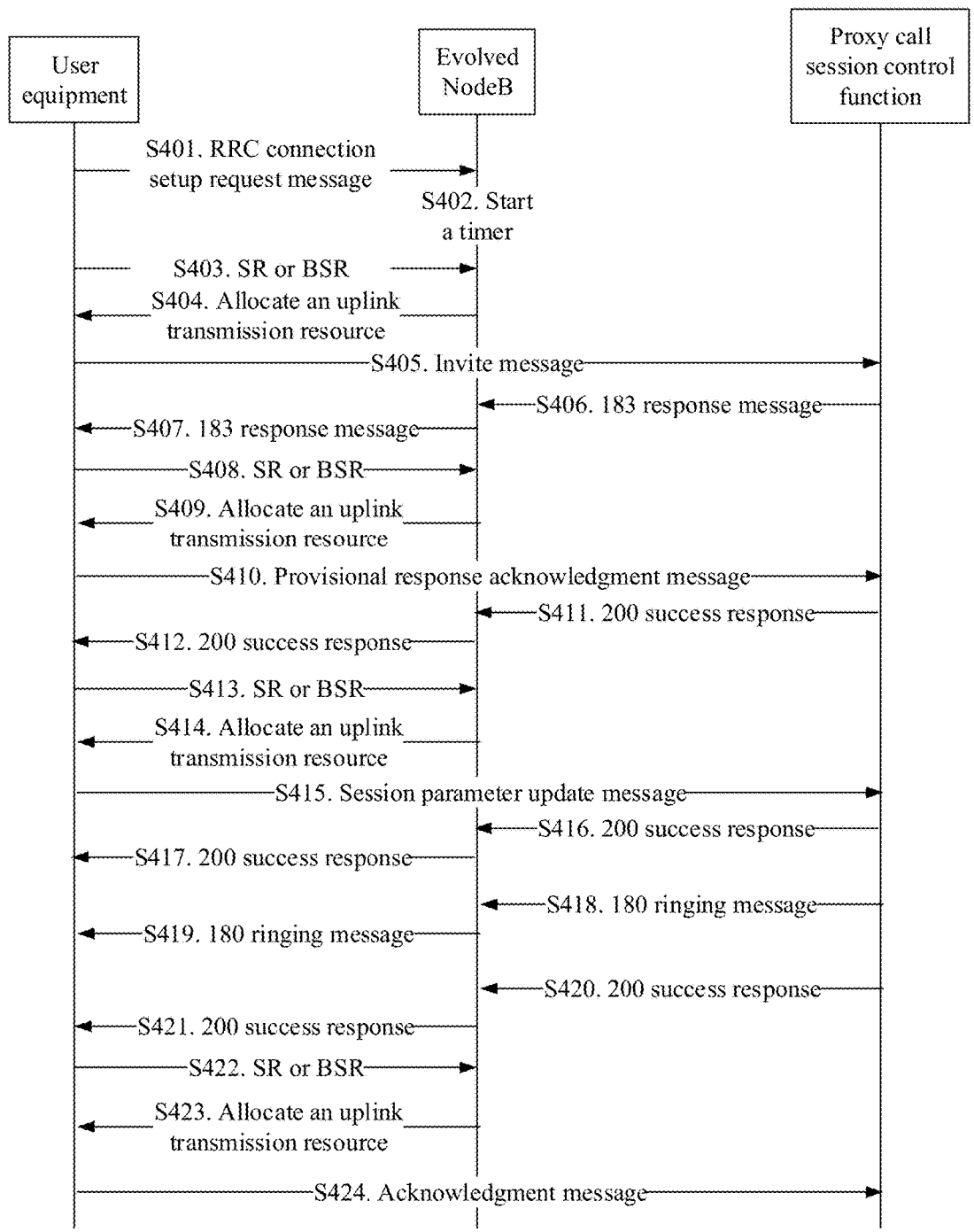
FIG. 4 is a schematic diagram of SIP signaling transmission in an LTE network according to an embodiment of the present invention.

As shown in FIG. 4, FIG. 4 is a schematic diagram of SIP signaling transmission in an LTE network. In FIG. 4, a P-CSCF, an evolved NodeB, and user equipment are included.

In the following, an example in which the user equipment in FIG. 4 is originating user equipment is used to describe how related SIP signaling is transmitted during setup of a VoLTE voice session.

S401. Originating UE sends an RRC connection setup request message to an evolved NodeB corresponding to the originating UE, where the RRC connection setup request message includes first voice session indication information, and the first voice session indication information is used to indicate that the RRC connection setup request message is sent due to a VoLTE voice session.

For details about a specific case in which the originating UE initiates the RRC connection setup request message carrying the first voice session indication information, refer to S301, and details are not repeated herein.

S402. The evolved NodeB starts a first timer after receiving the RRC connection setup request message including the first voice session indication information, where timing duration of the first timer is the first time period.

The evolved NodeB may further start a second timer. Timing duration of the second timer is the second time period. The first timer and the second timer may be a same entity, and the first time period may be the same as the second time period.

S403. The originating UE determines that an invite message needs to be sent to initiate setup of a VoLTE voice session, and sends an SR or a BSR to the evolved NodeB before sending the invite message.

S404. After receiving the SR or the BSR sent by the originating UE, the evolved NodeB determines whether the first timer expires, and if the first timer does not expire, the evolved NodeB preferentially allocates an uplink transmission resource to the originating UE according to the SR or the BSR sent by the originating UE; or after determining that the first timer expires, even if the evolved NodeB receives the SR or the BSR sent by the originating UE, the evolved NodeB does not need to preferentially allocate an uplink transmission resource to the originating UE.

S405. The originating UE sends the invite message by using the uplink transmission resource allocated by the evolved NodeB in S404.

S406. The evolved NodeB receives a downlink data packet in which a 183 response message is encapsulated and that is sent by an originating P-CSCF.

The evolved NodeB determines whether the second timer expires, and if the second timer does not expire, preferentially allocates a downlink transmission resource according to the downlink data packet. The evolved NodeB may no longer preferentially allocate, after determining that the second timer expires, the downlink transmission resource according to the downlink data packet to be sent to the originating UE.

S407. The evolved NodeB forwards, to the originating UE by using the downlink transmission resource, the downlink data packet corresponding to the 183 response message.

S408. The originating UE determines that a provisional response acknowledgment message (PRACK) needs to be sent, and sends an SR or a BSR to the evolved NodeB before sending the provisional response acknowledgment message.

S409. The evolved NodeB performs the procedure in step S404 after receiving the SR or the BSR sent by the originating UE, and details are not repeated herein.

S410. The originating UE sends the provisional response acknowledgment (PRACK) message by using the uplink transmission resource allocated by the evolved NodeB in S409.

S411. The evolved NodeB receives a downlink data packet in which a 200 success response (OK) message is encapsulated and that is sent by the originating P-CSCF, where the 200 OK message is a response to the PRACK message sent by the originating UE.

The evolved NodeB performs the procedure in step S406, and details are not repeated herein.

S412. The evolved NodeB sends, to the originating UE by using a downlink transmission resource allocated in S411, the downlink data packet corresponding to the 200 success response message.

S413. The originating UE determines that a session parameter update message needs to be sent, and sends an SR or a BSR to the evolved NodeB before sending the session parameter update message.

S414. The evolved NodeB performs the procedure in step S404 after receiving the SR or the BSR sent by the originating UE, and details are not repeated herein.

S415. The originating UE sends the session parameter update message by using the uplink transmission resource allocated by the evolved NodeB in S414.

S416. The evolved NodeB receives a downlink data packet in which a 200 success response (OK) message is encapsulated and that is sent by the originating P-CSCF, where the 200 OK message is a response to the update message sent by the originating UE.

The evolved NodeB performs the procedure in step S406, and details are not repeated herein.

S417. The evolved NodeB sends, to the originating UE by using a downlink transmission resource allocated in S416, the downlink data packet corresponding to the 200 success response message.

S418. The evolved NodeB receives a 180 ringing message sent by the originating P-CSCF.

The evolved NodeB performs the procedure in step S406, and details are not repeated herein.

S419. The evolved NodeB sends, to the originating UE by using a downlink transmission resource allocated in S418, a downlink data packet corresponding to the 180 ringing message.

S420. The evolved NodeB receives a 200 success response (OK) message sent by the originating P-CSCF, where the 200 OK message is a response to the invite message sent by the originating UE.

The evolved NodeB performs the procedure in step S406, and details are not repeated herein.

S421. The evolved NodeB sends, to the originating UE by using a downlink transmission resource allocated in S420, a downlink data packet corresponding to the 200 success response message.

S422. The originating UE determines that an acknowledgment (ACK) message needs to be sent, and sends the SR or the BSR to the evolved NodeB before sending the acknowledgment message.

S423. The evolved NodeB performs the procedure in step S404 after receiving the SR or the BSR sent by the originating UE, and details are not repeated herein.

S424. The originating UE sends the acknowledgment message by using the uplink transmission resource allocated in S414; in this case, setup of the VoLTE voice session is completed, and a call between the originating UE and terminating UE starts.

Figure 5:
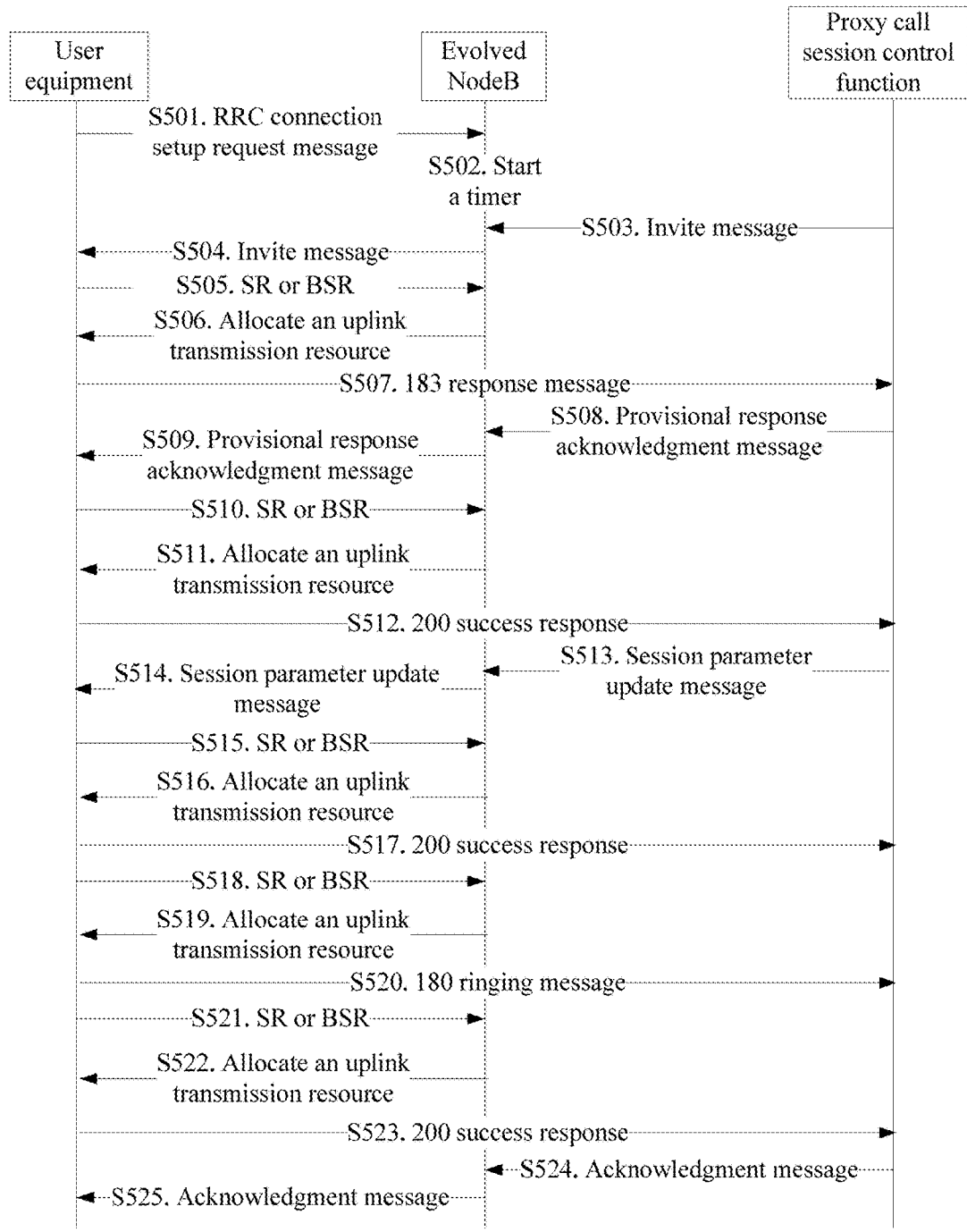
FIG. 5 is a schematic diagram of SIP signaling transmission in an LTE network according to an embodiment of the present invention.

As shown in FIG. 5, FIG. 5 is a schematic diagram of SIP signaling transmission in an LTE network. In FIG. 5, a P-CSCF, an evolved NodeB, and user equipment are included.

In the following, an example in which the user equipment in FIG. 5 is terminating user equipment is used to describe how related SIP signaling is transmitted during setup of a VoLTE voice session.

S501. Terminating UE sends an RRC connection setup request message to an evolved NodeB corresponding to the terminating UE, where the RRC connection setup request message includes first voice session indication information, and the first voice session indication information is used to indicate that the RRC connection setup request message is sent due to a VoLTE voice session.

For details about a specific case in which the terminating UE initiates the RRC connection setup request message carrying the first voice session indication information, refer to S301, and details are not repeated herein.

S502. The evolved NodeB starts a first timer after receiving the RRC connection setup request message including the first voice session indication information, where timing duration of the first timer is the first time period.

The evolved NodeB may further start a second timer. Timing duration of the second timer is the second time period. The first timer and the second timer may be a same entity, and the first time period may be the same as the second time period.

S503. The evolved NodeB receives a downlink data packet in which an invite message is encapsulated and that is sent by a terminating P-CSCF.

The evolved NodeB determines whether the second timer expires, and if the second timer does not expire, preferentially allocates a downlink transmission resource according to the downlink data packet. The evolved NodeB may no longer preferentially allocate, after determining that the second timer expires, the downlink transmission resource according to the downlink data packet to be sent to the terminating UE.

S504. The evolved NodeB sends, to the terminating UE by using a downlink transmission resource allocated in S503, the downlink data packet in which the invite message is encapsulated.

S505. The terminating UE sends an SR or a BSR to the evolved NodeB before determining that a 183 response message needs to be sent.

S506. After receiving the SR or the BSR sent by the terminating UE, the evolved NodeB determines whether the first timer expires, and if the first timer does not expire, the evolved NodeB preferentially allocates an uplink transmission resource to the terminating UE according to the SR or the BSR sent by the terminating UE; or after determining that the first timer expires, the evolved NodeB may no longer preferentially allocate an uplink transmission resource to the terminating UE according to the SR or the BSR sent by the terminating UE.

S507. The terminating UE sends the 183 response message by using the uplink transmission resource allocated by the evolved NodeB in S506.

S508. The evolved NodeB receives a downlink data packet in which a provisional response acknowledgment PRACK message is encapsulated and that is sent by the terminating P-CSCF.

The evolved NodeB performs the procedure in step S503, and details are not repeated herein.

S509. The evolved NodeB sends, to the terminating UE by using a downlink transmission resource allocated in S508, the downlink data packet in which the PRACK message is encapsulated.

S510. The terminating UE determines that a 200 success response (OK) message needs to be sent, and sends an SR or a BSR to the evolved NodeB before sending the 200 success response message, where the 200 OK message is a response to the PRACK message.

S511. The evolved NodeB performs the procedure in step S506 after receiving the SR or the BSR sent by the terminating UE, and details are not repeated herein.

S512. The terminating UE sends the 200 success response message by using the uplink transmission resource allocated by the evolved NodeB in S511.

S513. The evolved NodeB receives a downlink data packet in which a session parameter update message is encapsulated and that is sent by the terminating P-CSCF.

The evolved NodeB performs the procedure in step S503, and details are not repeated herein.

S514. The evolved NodeB sends, to the terminating UE by using a downlink transmission resource allocated in S513, the downlink data packet in which the update message is encapsulated.

S515. The terminating UE determines that a 200 success response (OK) message needs to be sent, and sends an SR or a BSR to the evolved NodeB before sending the provisional response acknowledgment message, where the 200 OK message is a response to the update message sent by the originating UE.

S516. The evolved NodeB performs the procedure in step S506 after receiving the SR or the BSR sent by the terminating UE, and details are not repeated herein.

S517. The terminating UE sends the 200 success response message by using the uplink transmission resource allocated by the evolved NodeB in S516.

S518. The terminating UE determines that a 180 ringing message needs to be sent, and sends an SR or a BSR to the evolved NodeB before sending the provisional response acknowledgment message.

S519. The evolved NodeB performs the procedure in step S506 after receiving the SR or the BSR sent by the terminating UE, and details are not repeated herein.

S520. The terminating UE sends the 180 ringing message by using the uplink transmission resource allocated by the evolved NodeB in S519.

S521. The terminating UE determines that a 200 success response (OK) message needs to be sent, and sends an SR or a BSR to the evolved NodeB before sending the provisional response acknowledgment message, where the 200 OK message is a response to the invite message sent by the originating UE.

S522. The evolved NodeB performs the procedure in step S506 after receiving the SR or the BSR sent by the terminating UE, and details are not repeated herein.

S523. The terminating UE sends the 200 success response message by using the uplink transmission resource allocated by the evolved NodeB in S522.

S524. The evolved NodeB receives a downlink data packet in which an acknowledgment (ACK) message is encapsulated and that is sent by the terminating P-CSCF.

The evolved NodeB performs the procedure in step S503, and details are not repeated herein.

S525. The evolved NodeB sends, to the terminating UE by using a downlink transmission resource allocated in S524, the downlink data packet in which the ACK message is encapsulated; in this case, setup of the VoLTE voice session is completed, and a call between the originating UE and the terminating UE starts.

Figure 6:
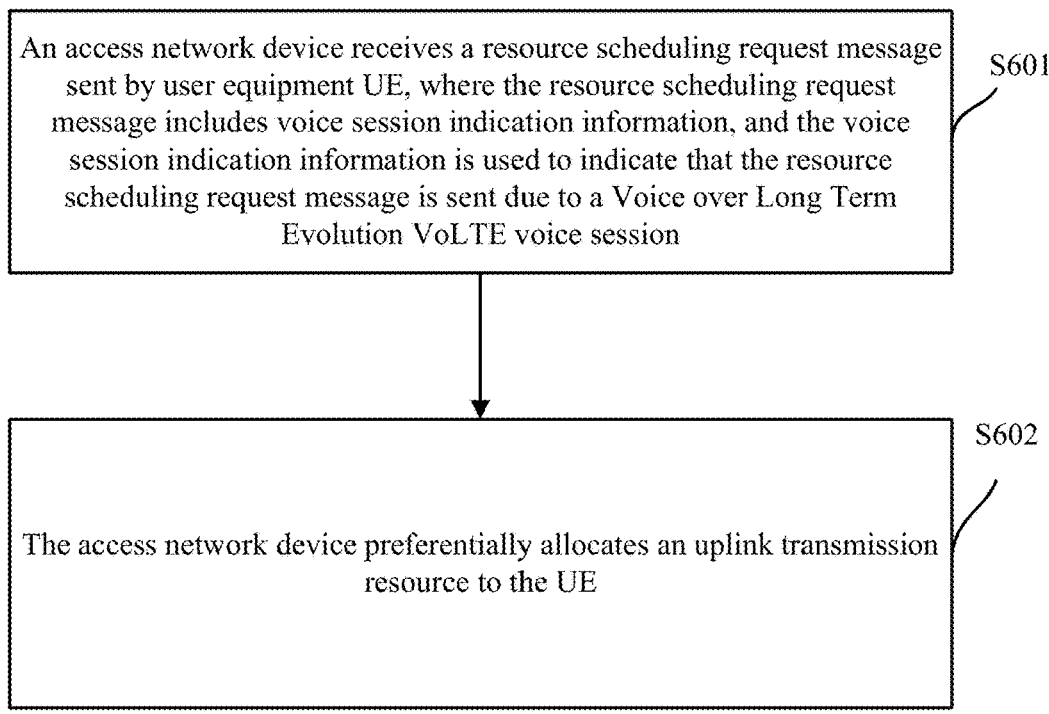
FIG. 6 is a schematic flowchart of a service processing method according to an embodiment of the present invention.

Based on the foregoing descriptions, as shown in FIG. 6, FIG. 6 is a schematic flowchart of a service processing method according to an embodiment of the present invention.

As shown in FIG. 6, an embodiment of the method includes the following steps.

S601. An access network device receives a resource scheduling request message sent by user equipment UE, where the resource scheduling request message includes voice session indication information, and the voice session indication information is used to indicate that the resource scheduling request message is sent due to a Voice over Long Term Evolution VoLTE voice session.

The resource scheduling request message that is sent by the UE and that is received by the access network device may be an SR, or may be a BSR. This is not limited in this embodiment of the present invention.

The voice session indication information is generated, by the UE after the UE determines that the VoLTE voice session needs to be set up, in the resource scheduling request message sent for transmission of VoLTE voice session signaling.

Optionally, the VoLTE voice session signaling is SIP signaling for the VoLTE voice session. For example, the VoLTE voice session signaling may be specifically invite signaling, 183 response signaling, or the like.

S602. The access network device preferentially allocates an uplink transmission resource to the UE.

After determining that the resource scheduling request message includes the voice session indication information, the access network device preferentially allocates the uplink transmission resource to the UE according to the resource scheduling request sent by the UE.

Further, the access network device may preferentially allocate, within a third time period that is after the access network device receives the resource scheduling request message including the voice session indication information, a downlink transmission resource if receiving a downlink data packet to be sent to the UE, and send the downlink data packet to the UE by using the downlink transmission resource.

Optionally, the third time period is a third time period corresponding to the resource scheduling request message. Lengths of third time periods corresponding to all resource scheduling request messages may be different.

For example, a length of a third time period corresponding to a resource scheduling request message may be directly proportional to a quantity of times of receiving, by the access network device, the resource scheduling request message including the voice session indication information. That is, a length of a third time period corresponding to an $N^{th}$ time of receiving the resource scheduling request message including the voice session indication information is less than a length of a third time period corresponding to an $(N+1)^{th}$ time of receiving the resource scheduling request message including the voice session indication information, where N is a positive integer.

For example, a mapping relationship between a quantity of times of receiving the resource scheduling request message and a third time period may be set up. For example, a third time period corresponding to a resource scheduling request message received by the access network device for the first time is A; a third time period corresponding to a resource scheduling request message received by the access network device for the second time is A; a third time period corresponding to a resource scheduling request message received by the access network device for the third time is B; a third time period corresponding to a resource scheduling request message received by the access network device for the fourth time is C. The access network device may obtain a corresponding third time period according to a quantity of times of receiving a resource scheduling request message.

Optionally, the third time period may be set to maximum/average statistical duration required during setup of a VoLTE voice session. This can ensure that an uplink data packet sent by the UE is preferentially scheduled during setup of the VoLTE voice session.

Specifically, the access network device starts a third timer after receiving the resource scheduling request message. Timing duration of the third timer is the third time period; before the third timer expires, the access network device preferentially allocates the downlink transmission resource if receiving the downlink data packet to be sent to the UE.

The downlink data packet related to the VoLTE voice session is usually transmitted on a VoLTE voice signaling plane bearer. Therefore, to reduce workload of the access network device, further, before preferentially allocating downlink transmission resources to all the downlink data packets to be sent to the UE, the access network device needs to determine that the downlink data packets are transmitted on the VoLTE voice signaling plane bearer. The VoLTE voice signaling plane bearer is a bearer available for transmission of VoLTE voice session signaling. Certainly, in addition to the VoLTE voice session signaling, the bearer may be used for transmission of another type of data. This is not limited herein. Specifically, after receiving the downlink data packets to be sent to the UE, the access network device first determines whether the downlink data packets to be sent to the UE are transmitted on the VoLTE voice signaling plane bearer; and if the downlink data packets to be sent to the UE are transmitted on the VoLTE voice signaling plane bearer and it is determined that the third timer does not expire, the access network device preferentially allocates the downlink transmission resources for the downlink data packets to be sent to the UE, and sends the downlink data packets to the UE by using the downlink transmission resources; or if determining that the downlink data packets to be sent to the UE are not transmitted on the VoLTE voice signaling plane bearer, the access network device may not preferentially allocate the downlink transmission resources.

Further, a value of a QCI of the VoLTE voice signaling plane bearer is usually 5. Therefore, the access network device may preferentially schedule a downlink data packet transmitted on a bearer whose QCI value is 5, so as to reduce workload of the access network device. Specifically, after receiving the downlink data packets to be sent to the UE, the access network device first determines whether the downlink data packets to be sent to the UE are transmitted on the bearer whose QCI value is 5; and if the downlink data packets to be sent to the UE are transmitted on the bearer whose QCI value is 5 and it is determined that the third timer does not expire, the access network device preferentially allocates the downlink transmission resources for the downlink data packets to be sent to the UE, and sends the downlink data packets to the UE by using the downlink transmission resources; or if determining that the downlink data packets to be sent to the UE are not transmitted on the bearer whose QCI value is 5, the access network device may not preferentially allocate the downlink transmission resources.

In the foregoing solution, after determining that the received resource scheduling request message includes the voice session indication information, the access network device determines that the voice session indication information in the resource scheduling request message is generated in the resource scheduling request message by the UE after the UE determines that the VoLTE voice session signaling needs to be transmitted. After receiving the resource scheduling request message, the access network device preferentially allocates the uplink transmission resource to the UE according to the resource scheduling request message sent by the UE, and preferentially allocates, within the third time period that is after the access network device receives the resource scheduling request message, the downlink transmission resource according to the downlink data packet to be sent to the UE, to preferentially process a downlink data packet related to the VoLTE voice session. This can ensure that all uplink and downlink VoLTE voice session signaling of the UE are scheduled preferentially, and ensure setup of the VoLTE voice session.

Figure 7:
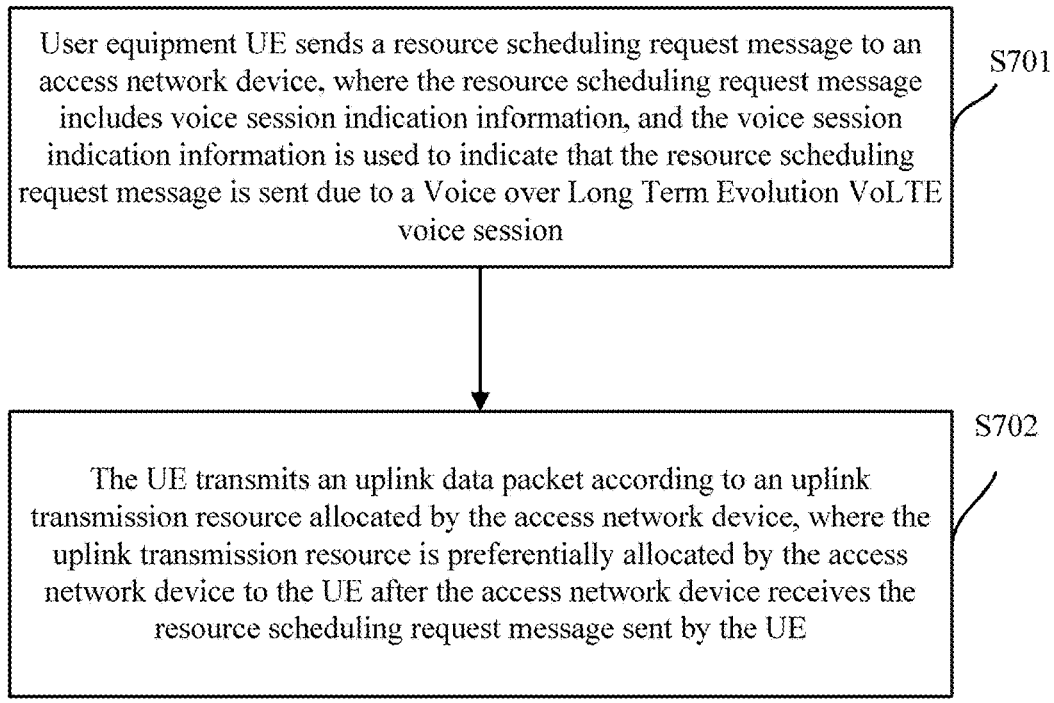
FIG. 7 is a schematic flowchart of a service processing method according to an embodiment of the present invention.

Based on the foregoing descriptions, as shown in FIG. 7, FIG. 7 is a schematic flowchart of a service processing method according to an embodiment of the present invention.

As shown in FIG. 7, an embodiment of the method includes the following steps.

S701. User equipment UE sends a resource scheduling request message to an access network device, where the resource scheduling request message includes voice session indication information, and the voice session indication information is used to indicate that the resource scheduling request message is sent due to a Voice over Long Term Evolution VoLTE voice session.

The resource scheduling request message sent by the UE to the access network device may be an SR, or may be a BSR. This is not limited in this embodiment of the present invention.

Before sending the resource scheduling request message including the voice session indication information to the access network device, the UE determines whether VoLTE voice session signaling needs to be transmitted, and if determining that the VoLTE voice session signaling needs to be transmitted, sends the resource scheduling request message including the voice session indication information to the access network device.

For example, originating UE determines that VoLTE voice session signaling, for example, invite signaling, needs to be sent; in this case, the UE needs to send the resource scheduling request message including the voice session indication information to the access network device.

For example, terminating UE determines that VoLTE voice session signaling needs to be sent. For example, after receiving invite signaling sent by originating UE, the terminating UE needs to send 183 response signaling to the originating UE; in this case, the UE needs to send the resource scheduling request message including the voice session indication information to the access network device.

Optionally, the VoLTE voice session signaling is SIP signaling for the VoLTE voice session.

S702. The UE transmits an uplink data packet according to an uplink transmission resource allocated by the access network device, where the uplink transmission resource is preferentially allocated by the access network device to the UE after the access network device receives the resource scheduling request message sent by the UE.

For better understanding and implementation of the foregoing technical solution of this embodiment of the present invention, the following provides detailed descriptions with reference to some specific application scenarios.

Figure 8:
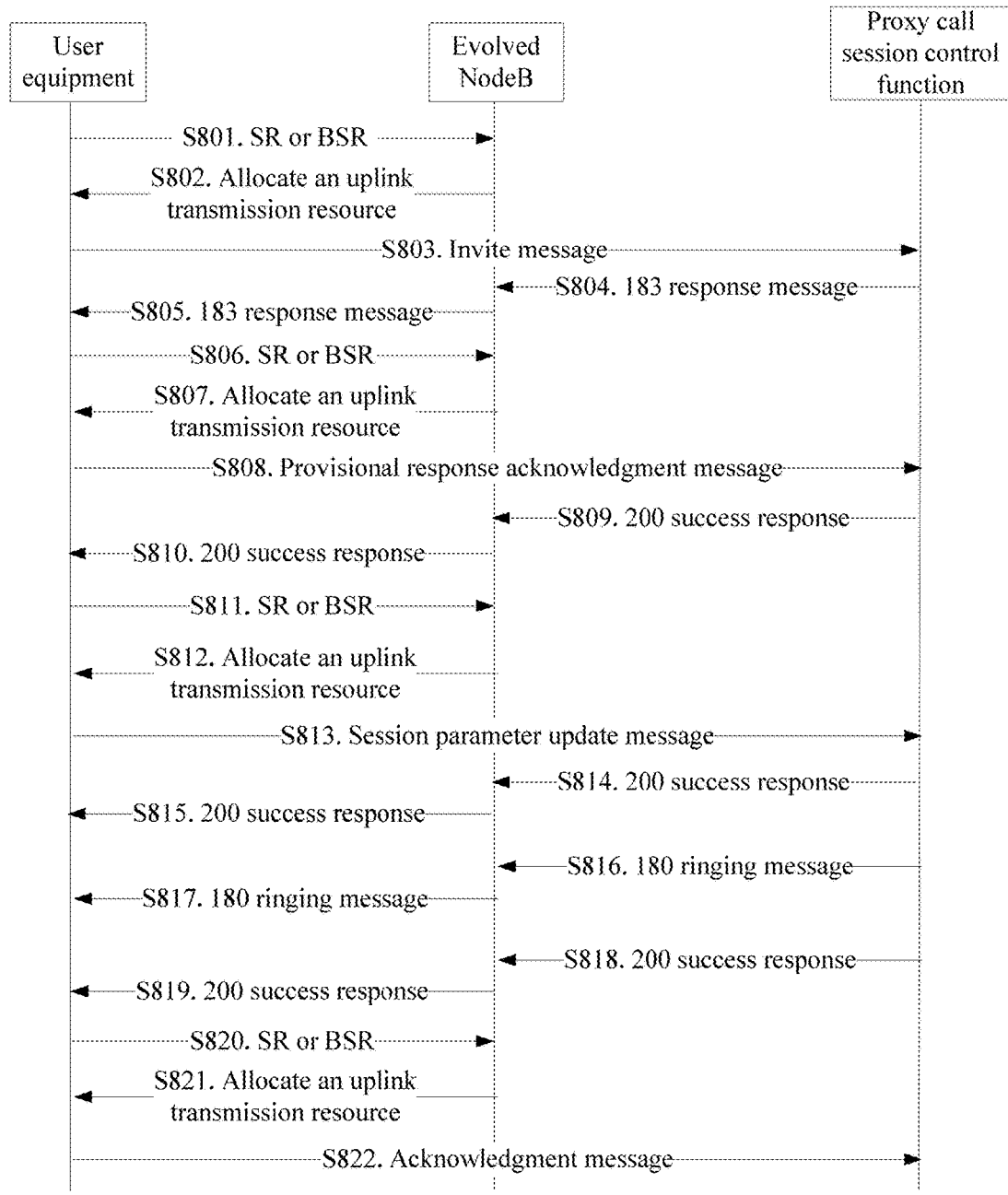
FIG. 8 is a schematic diagram of SIP signaling transmission in an LTE network according to an embodiment of the present invention.

As shown in FIG. 8, FIG. 8 is a schematic diagram of SIP signaling transmission in an LTE network. In FIG. 8, a P-CSCF, an evolved NodeB, and user equipment are included.

In the following, an example in which the user equipment in FIG. 8 is originating user equipment is used to describe how related SIP signaling is transmitted during setup of a VoLTE voice session.

S801. Originating UE determines that an invite message needs to be sent to initiate setup of a VoLTE voice session, and sends an SR or a BSR to the evolved NodeB before sending the invite message, where the SR or the BSR includes voice session indication information.

S802. After receiving the SR or the BSR sent by originating UE, the evolved NodeB preferentially allocates an uplink transmission resource if determining that the SR or the BSR includes the voice session indication information.

The evolved NodeB may further start a third timer. Timing duration of the third timer is the third time period.

S803. The originating UE sends the invite message by using the uplink transmission resource allocated by the evolved NodeB in S802.

S804. The evolved NodeB receives a downlink data packet in which a 183 response message is encapsulated and that is sent by an originating P-CSCF.

The evolved NodeB determines whether the third timer expires, and if the third timer does not expire, preferentially allocates a downlink transmission resource according to the downlink data packet if receiving the downlink data packet to be sent to the originating UE.

S805. The evolved NodeB sends, to the originating UE by using a downlink transmission resource allocated in S804, the downlink data packet in which the 183 response message is encapsulated.

S806. The originating UE determines that a provisional response acknowledgment (PRACK) message needs to be sent, and sends the SR or the BSR to the evolved NodeB before sending the provisional response acknowledgment message, where the SR or the BSR includes voice session indication information.

S807. After receiving the SR or the BSR sent by the originating UE, the evolved NodeB preferentially allocates an uplink transmission resource if determining that the SR or the BSR includes the voice session indication information.

S808. The originating UE sends the provisional response acknowledgment message by using the uplink transmission resource allocated by the evolved NodeB in S807.

S809. The evolved NodeB receives a downlink data packet in which a 200 success response (OK) message is encapsulated and that is sent by the originating P-CSCF, where the 200 OK message is a response to the PRACK message.

The evolved NodeB performs the procedure in step S804, and details are not repeated herein.

S810. The evolved NodeB sends, to the originating UE by using a downlink transmission resource allocated in S809, the downlink data packet in which the 200 success response message is encapsulated.

S811. The originating UE determines that a session parameter update message needs to be sent, and sends the SR or the BSR to the evolved NodeB before sending the session parameter update message, where the SR or the BSR includes voice session indication information.

S812. After receiving the SR or the BSR sent by the originating UE, the evolved NodeB preferentially allocates an uplink transmission resource if determining that the SR or the BSR includes the voice session indication information.

S813. The originating UE sends the session parameter update message by using the uplink transmission resource allocated by the evolved NodeB in S812.

S814. The evolved NodeB receives a downlink data packet in which a 200 success response (OK) message is encapsulated and that is sent by the originating P-CSCF, where the 200 OK message is a response to the update message.

The evolved NodeB performs the procedure in step S804, and details are not repeated herein.

S815. The evolved NodeB sends, to the originating UE by using a downlink transmission resource allocated in S814, the downlink data packet in which the 200 success response message is encapsulated.

S816. The evolved NodeB receives a downlink data packet in which a 180 ringing message is encapsulated and that is sent by the originating P-CSCF.

The evolved NodeB performs the procedure in step S804, and details are not repeated herein.

S817. The evolved NodeB sends, to the originating UE by using the downlink data packet allocated in S816, the downlink data packet in which the 180 ringing message is encapsulated.

S818. The evolved NodeB receives a downlink data packet in which a 200 success response (OK) message is encapsulated and that is sent by the originating P-CSCF, where the 200 OK message is a response to the invite message.

The evolved NodeB performs the procedure in step S804, and details are not repeated herein.

S819. The evolved NodeB sends the 200 success response message by using a downlink transmission resource allocated in S818.

S820. The originating UE determines that an acknowledgment (ACK) message needs to be sent, and sends the SR or the BSR to the evolved NodeB before sending the acknowledgment message, where the SR or the BSR includes voice session indication information.

S821. After receiving the SR or the BSR sent by the originating UE, the evolved NodeB preferentially allocates an uplink transmission resource if determining that the SR or the BSR includes the voice session indication information.

S822. The originating UE sends the acknowledgment message by using the uplink transmission resource allocated in S821; in this case, setup of the VoLTE voice session is completed, and a call between the originating UE and terminating UE starts.

Figure 9:
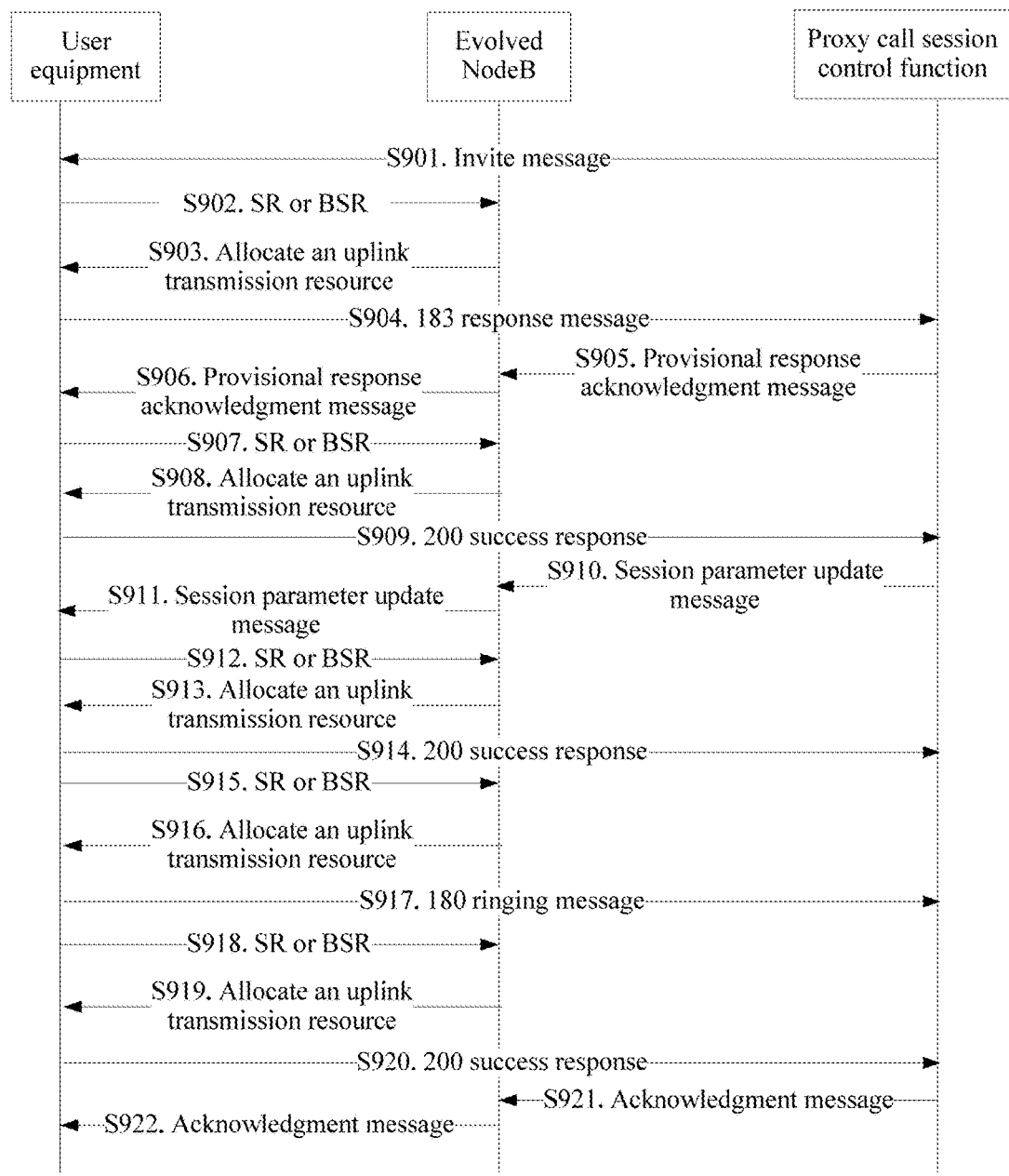
FIG. 9 is a schematic diagram of SIP signaling transmission in an LTE network according to an embodiment of the present invention.

As shown in FIG. 9, FIG. 9 is a schematic diagram of SIP signaling transmission in an LTE network. In FIG. 9, a P-CSCF, an evolved NodeB, and user equipment are included.

In the following, an example in which the user equipment in FIG. 9 is terminating user equipment is used to describe how related SIP signaling is transmitted during setup of a VoLTE voice session.

S901. Terminating UE receives an invite message sent by a terminating P-CSCF.

S902. The terminating UE sends an SR or a BSR to the evolved NodeB before determining that a 183 response message needs to be sent, where the SR or the BSR includes voice session indication information.

S903. After receiving the SR or the BSR sent by the terminating UE, the evolved NodeB preferentially allocates an uplink transmission resource if determining that the SR or the BSR includes the voice session indication information.

The evolved NodeB may further start a third timer. Timing duration of the third timer is the third time period.

S904. The terminating UE sends the 183 response message by using the uplink transmission resource allocated by the evolved NodeB in S903.

S905. The evolved NodeB receives a downlink data packet in which a provisional response acknowledgment (PRACK) message is encapsulated and that is sent by the terminating P-CSCF.

The evolved NodeB determines whether the third timer expires, and if the third timer does not expire, preferentially allocates a downlink transmission resource according to the downlink data packet if receiving the downlink data packet to be sent to the terminating UE.

S906. The evolved NodeB sends, to originating UE by using a downlink transmission resource allocated in S905, the downlink data packet in which the provisional response acknowledgment message is encapsulated.

S907. The terminating UE determines that a 200 success response (OK) message needs to be sent, and sends an SR or a BSR to the evolved NodeB before sending the provisional response acknowledgment message, where the SR or the BSR includes voice session indication information, and the 200 OK message is a response to the PRACK message.

S908. After receiving the SR or the BSR sent by the terminating UE, the evolved NodeB preferentially allocates an uplink transmission resource if determining that the SR or the BSR includes the voice session indication information.

S909. The terminating UE sends a 200 success response message by using the uplink transmission resource allocated by the evolved NodeB in S908.

S910. The evolved NodeB receives a downlink data packet in which a session parameter update message is encapsulated and that is sent by the terminating P-CSCF.

The evolved NodeB performs the procedure in step S905, and details are not repeated herein.

S911. The evolved NodeB sends, to the originating UE by using a downlink transmission resource allocated in S910, the downlink data packet in which the session parameter update message is encapsulated.

S912. The terminating UE determines that a 200 success response (OK) message needs to be sent, and sends an SR or a BSR to the evolved NodeB before sending the provisional response acknowledgment message, where the SR or the BSR includes voice session indication information, and the 200 OK message is a response to the update message.

S913. After receiving the SR or the BSR sent by the terminating UE, the evolved NodeB preferentially allocates an uplink transmission resource if determining that the SR or the BSR includes the voice session indication information.

S914. The terminating UE sends a 200 success response message by using the uplink transmission resource allocated by the evolved NodeB in S913.

S915. The terminating UE determines that a 180 ringing message needs to be sent, and sends an SR or a BSR to the evolved NodeB before sending the provisional response acknowledgment message, where the SR or the BSR includes voice session indication information.

S916. After receiving the SR or the BSR sent by the terminating UE, the evolved NodeB preferentially allocates an uplink transmission resource if determining that the SR or the BSR includes the voice session indication information.

S917. The terminating UE sends the 180 ringing message by using the uplink transmission resource allocated by the evolved NodeB in S916.

S918. The terminating UE determines that a 200 success response (OK) message needs to be sent, and sends an SR or a BSR to the evolved NodeB before sending the provisional response acknowledgment message, where the SR or the BSR includes voice session indication information, and the 200 OK message is a response to the invite message.

S919. After receiving the SR or the BSR sent by the terminating UE, the evolved NodeB preferentially allocates an uplink transmission resource if determining that the SR or the BSR includes the voice session indication information.

S920. The terminating UE sends a 200 success response message by using the uplink transmission resource allocated by the evolved NodeB in S919.

S921. The evolved NodeB receives a downlink data packet in which an acknowledgment message is encapsulated and that is sent by the terminating P-CSCF.

The evolved NodeB performs the procedure in step S905, and details are not repeated herein.

S922. The evolved NodeB sends, to the originating UE by using a downlink transmission resource allocated in S921, the downlink data packet in which the acknowledgment message is encapsulated; in this case, setup of the VoLTE voice session is completed, and a call between the originating UE and the terminating UE starts.

Figure 10:
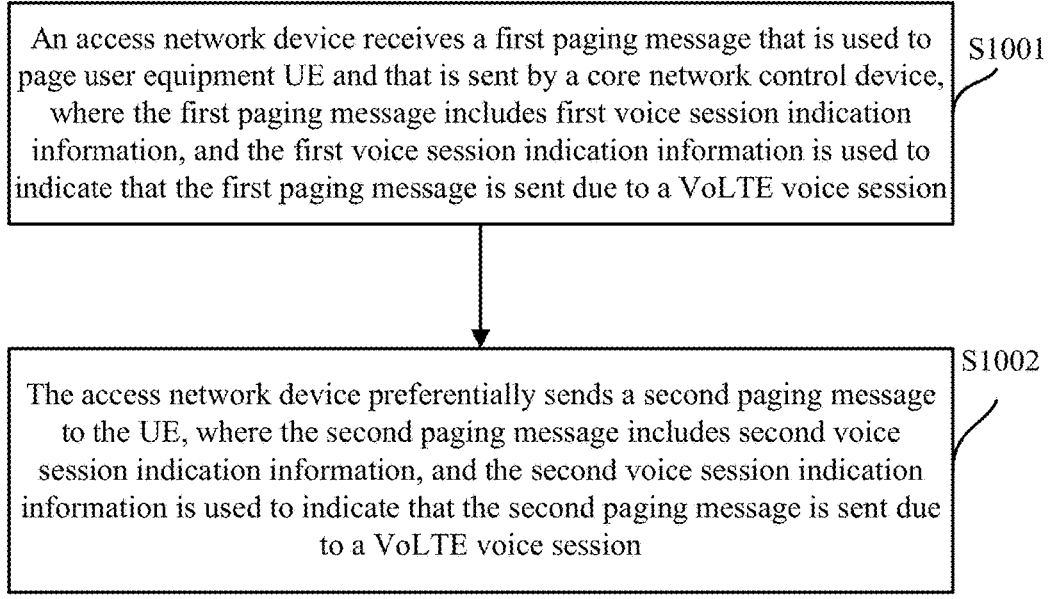
FIG. 10 is a schematic flowchart of a service processing method according to an embodiment of the present invention.

Based on the foregoing descriptions, as shown in FIG. 10, FIG. 10 is a schematic flowchart of a service processing method according to an embodiment of the present invention.

As shown in FIG. 10, an embodiment of the method includes the following steps.

S1001. An access network device receives a first paging message that is used to page user equipment UE and that is sent by a core network control device, where the first paging message includes first voice session indication information, and the first voice session indication information is used to indicate that the first paging message is sent due to a VoLTE voice session.

It should be noted that the access network device may be an evolved NodeB. The core network control device may be an MME.

Before the core network control device sends the first paging message to the access network device, the following procedures may be performed:

encapsulating, by an IMS network device corresponding to terminating UE, invite signaling in a data packet after receiving the invite signaling, and generating fourth voice session indication information in the data packet; and sending, by the IMS network device corresponding to the terminating UE, the data packet including the fourth voice session indication information to a core network gateway device, where the IMS network device may be a P-CSCF, and the core network gateway device may be a P-GW or an SGW.

The fourth voice session indication information may be in any one of the following fields of the data packet in which the invite signaling is encapsulated:

a particular differentiated services code point DSCP, terms of service TOS, a traffic class Traffic Class, a flow label Flow Label, or a field of General Packet Radio Service GPRS Tunneling Protocol that carries the downlink data packet.

After receiving the downlink data packet that includes the fourth voice session indication information and that is sent by the IMS network device, the core network gateway device, namely, the PGW, generates fifth voice session indication information to replace the fourth voice session indication information. Certainly, alternatively, the PGW may not generate fifth voice session indication information, but directly use the received fourth voice session indication information as the fifth voice session indication information, encapsulate the received fourth voice session indication information in a downlink data packet, and transfer the downlink data packet to a next-hop node, for example, the core network gateway device, namely, SGW.

The fifth voice session indication information may be in any one of the following fields of the downlink data packet:

a particular differentiated services code point DSCP, terms of service TOS, a traffic class Traffic Class, a flow label Flow Label, or a field of General Packet Radio Service GPRS Tunneling Protocol that carries the downlink data packet.

After receiving the downlink data packet including the fifth voice session indication information, if determining that there is no downlink data path for the UE, the core network gateway device, namely, the SGW, generates third voice session indication information to replace the fifth voice session indication information. Certainly, alternatively, the core network gateway device, namely, the SGW, may not generate third voice session indication information, but directly use the received fifth voice session indication information as the third voice session indication information, encapsulate the received fifth voice session indication information in a downlink data notification message, and send the downlink data notification message to a core network control device. The core network control device may be an MME.

The third voice session indication information may be in any one of the following fields of the downlink data notification message:

a particular differentiated services code point DSCP, terms of service TOS, a traffic class Traffic Class, a flow label Flow Label, or a field of General Packet Radio Service GPRS Tunneling Protocol that carries the downlink data packet.

After receiving the downlink data packet including the third voice session indication information, the core network control device generates first voice session indication information to replace the third voice session indication information. Certainly, alternatively, the core network control device may not generate first voice session indication information, but directly use the received third voice session indication information as the first voice session indication information, encapsulate the received third voice session indication information in a first paging message, and send the first paging message to the access network device.

S1002. The access network device preferentially sends a second paging message to the UE, where the second paging message includes second voice session indication information, and the second voice session indication information is used to indicate that the second paging message is sent due to a VoLTE voice session.

It should be noted that specific content of the first voice session indication information may be the same as that of the second voice session indication information, or specific content of the first voice session indication information may be different from that of the second voice session indication information. That is, the access network device may not generate the second voice session indication information, but directly use the received first voice session indication information as the second voice session indication information, encapsulate the received first voice session indication information in a second paging message, and send the second paging message to the UE.

Optionally, after sending the second paging message to the UE, the access network device may further preferentially process a connection setup message sent by the UE. The connection setup message may be an RRC connection setup request message, or may be an RRC connection setup complete message.

Further, the access network device starts a timer after sending the second paging message to the UE, and before the timer expires, preferentially processes the connection setup message sent by the UE. Timing duration of the timer may be set to maximum/average statistical duration required during setup of a VoLTE voice session. This can ensure that the connection setup message sent by the UE is preferentially scheduled during setup of the VoLTE voice session.

Figure 11:
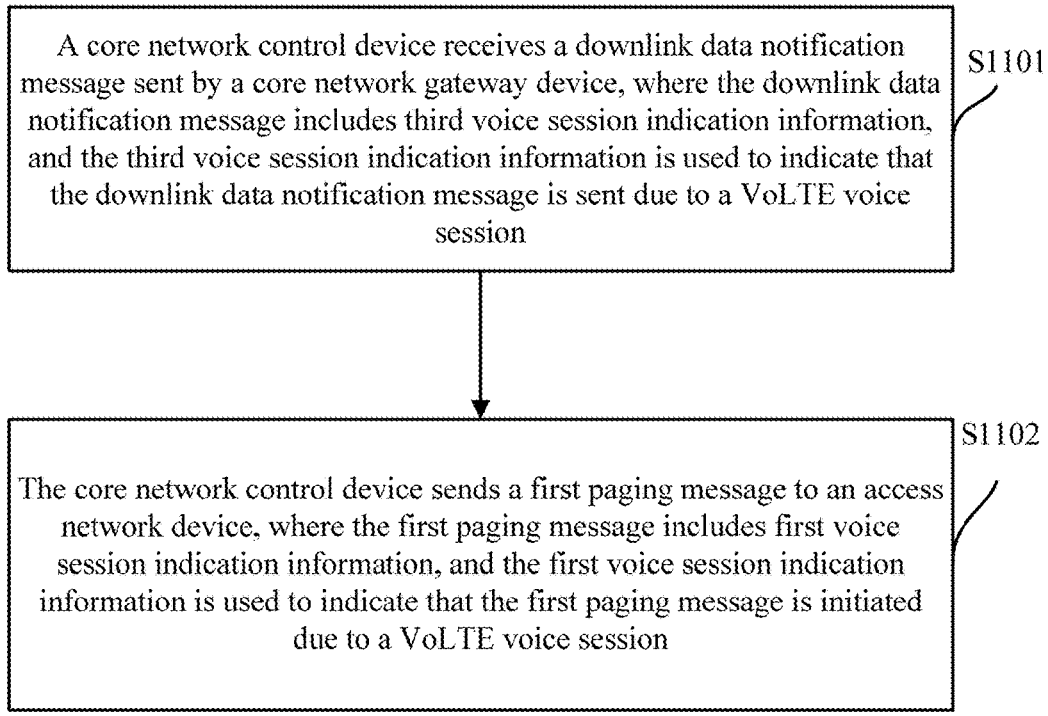
FIG. 11 is a schematic flowchart of a service processing method according to an embodiment of the present invention.

Based on the foregoing descriptions, as shown in FIG. 11, FIG. 11 is a schematic flowchart of a service processing method according to an embodiment of the present invention.

As shown in FIG. 11, an embodiment of the method includes the following steps.

S1101. A core network control device receives a downlink data notification message sent by a core network gateway device, where the downlink data notification message includes third voice session indication information, and the third voice session indication information is used to indicate that the downlink data notification message is sent due to a VoLTE voice session.

It should be noted that the core network gateway device may be an SGW or a PGW. The core network control device may be an MME.

Before the core network control device receives the downlink data notification message sent by the core network gateway device, the following procedures may be performed:

encapsulating, by an IMS network device corresponding to terminating UE, invite signaling in a data packet after receiving the invite signaling, and generating fourth voice session indication information in the data packet; and sending, by the IMS network device corresponding to the terminating UE, the data packet including the fourth voice session indication information to the core network gateway device, where the IMS network device may be a P-CSCF.

The fourth voice session indication information may be in any one of the following fields of the data packet in which the invite signaling is encapsulated:

a particular differentiated services code point DSCP, terms of service TOS, a traffic class Traffic Class, a flow label Flow Label, or a field of General Packet Radio Service GPRS Tunneling Protocol that carries the downlink data packet.

After receiving the downlink data packet that includes the fourth voice session indication information and that is sent by the IMS network device, the core network gateway device, namely, the PGW, generates fifth voice session indication information to replace the fourth voice session indication information. Certainly, alternatively, the core network gateway device may not generate fifth voice session indication information, but directly use the received fourth voice session indication information as the fifth voice session indication information, encapsulate the received fourth voice session indication information in a downlink data packet, and transfer the downlink data packet to a next-hop node, for example, the core network gateway device, namely, the SGW.

The fifth voice session indication information may be in any one of the following fields of the downlink data packet:

a particular differentiated services code point DSCP, terms of service TOS, a traffic class Traffic Class, a flow label Flow Label, or a field of General Packet Radio Service GPRS Tunneling Protocol that carries the downlink data packet.

After receiving the downlink data packet including the fifth voice session indication information, if determining that there is no downlink data path for the UE, the core network gateway device, namely, the SGW, generates third voice session indication information to replace the fifth voice session indication information. Certainly, alternatively, the core network gateway device, namely, the SGW, may not generate third voice session indication information, but directly use the received fifth voice session indication information as the third voice session indication information, encapsulate the received fifth voice session indication information in a downlink data notification message, and send the downlink data notification message to the core network control device.

S1102. The core network control device sends a first paging message to an access network device, where the first paging message includes first voice session indication information, and the first voice session indication information is used to indicate that the first paging message is initiated due to a VoLTE voice session.

The third voice session indication information may be in any one of the following fields of the downlink data notification message:

a particular differentiated services code point DSCP, terms of service TOS, a traffic class Traffic Class, a flow label Flow Label, or a field of General Packet Radio Service GPRS Tunneling Protocol that carries the downlink data packet.

Based on the procedures in the foregoing methods, an embodiment of the present invention further provides a service processing apparatus. For specific content of the apparatus, refer to the foregoing method embodiments, and details are not repeated herein.

Figure 12:
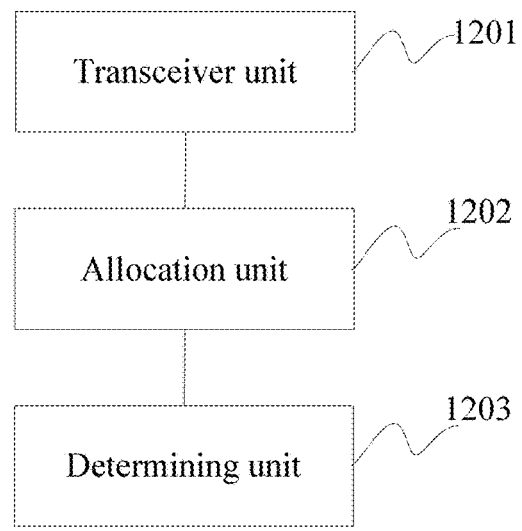
FIG. 12 is a schematic structural diagram of a service processing apparatus according to an embodiment of the present invention.

As shown in FIG. 12, FIG. 12 is a schematic structural diagram of a service processing apparatus according to an embodiment of the present invention.

Referring to FIG. 12, an embodiment of the apparatus includes:

a transceiver unit 1201, configured to receive a connection setup message sent by user equipment UE, where the connection setup message includes first voice session indication information, and the first voice session indication information is used to indicate that the connection setup message is sent due to a Voice over Long Term Evolution VoLTE voice session; and an allocation unit 1202, configured to preferentially allocate, within a first time period that is after the connection setup request message is received, an uplink transmission resource to the UE if a resource scheduling request message sent by the UE is received.

In an embodiment, the first voice session indication information is originating voice session indication information used to indicate that the connection setup message is sent due to an originating VoLTE voice session; or the first voice session indication information is a terminated voice session indication used to indicate that the connection setup message is sent due to a terminated VoLTE voice session.

In an embodiment, the allocation unit 1202 is further configured to:

preferentially allocate, within a second time period that is after the connection setup message is received, a downlink transmission resource if the access network device receives a downlink data packet to be sent to the UE, and send the downlink data packet to the UE by using the downlink transmission resource.

In an embodiment, the allocation unit 1202 is specifically configured to:

start a first timer after the connection setup request message is received, where timing duration of the first timer is the first time period; and preferentially allocate, before the first timer expires, the uplink transmission resource to the UE if the resource scheduling request message sent by the UE is received.

In an embodiment, the allocation unit 1202 is specifically configured to:

start a second timer after the connection setup request message is received, where timing duration of the second timer is the second time period; and preferentially allocate, before the second timer expires, the downlink transmission resource if the downlink data packet to be sent to the UE is received.

In an embodiment, the apparatus further includes a determining unit 1203. The determining unit 1203 is configured to:

determine that the downlink data packet is transmitted on a VoLTE voice signaling plane bearer, where the VoLTE voice signaling plane bearer is a bearer available for transmission of VoLTE voice session signaling.

In an embodiment, a value of a quality of service class identifier QCI of the VoLTE voice signaling plane bearer is 5.

In an embodiment, the transceiver unit 1201 is specifically configured to:

send a paging message to the UE, where the paging message includes second voice session indication information, and the second voice session indication information is used to indicate that the paging message is sent due to a terminated VoLTE voice session.

In an embodiment, the connection setup message includes one or more of the following:

an RRC connection setup request message; or
an RRC connection setup complete message.

In an embodiment, the resource scheduling request message includes one or more of the following:

a schedule request SR; or
a buffer status report BSR.

Figure 13:
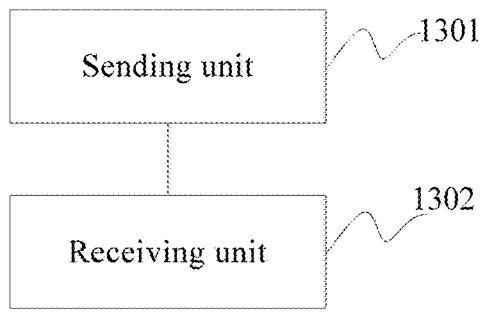
FIG. 13 is a schematic structural diagram of a service processing apparatus according to an embodiment of the present invention.

As shown in FIG. 13, FIG. 13 is a schematic structural diagram of a service processing apparatus according to an embodiment of the present invention.

Referring to FIG. 13, an embodiment of the apparatus includes:

a sending unit 1301, configured to send a connection setup message to an access network device, where the connection setup message includes first voice session indication information, and the first voice session indication information is used to indicate that the connection setup message is sent due to a Voice over Long Term Evolution VoLTE voice session.

The sending unit 1301 is configured to: send a resource scheduling request message to the access network device, and transmit an uplink data packet according to an uplink transmission resource allocated by the access network device, where the uplink transmission resource is preferentially allocated by the access network device to the UE within a first time period that is after the access network device receives the connection setup message sent by the UE.

In an embodiment, the sending unit 1301 is specifically configured to:

send the connection setup message to the access network device if it is determined that an originating VoLTE voice session needs to be set up, where the connection setup message includes originating voice session indication information, and the originating voice session indication information is used to indicate that the connection setup message is sent due to the originating VoLTE voice session; or send the connection setup message to the access network device if it is determined that a terminated VoLTE voice session needs to be set up, where the connection setup message includes terminated voice session indication information, and the terminated voice session indication information is used to indicate that the connection setup message is sent due to the terminated VoLTE voice session.

In an embodiment, the apparatus further includes a receiving unit 1302. The receiving unit 1302 is configured to:

receive a paging message sent by the access network device; and determine that the paging message includes second voice session indication information.

In an embodiment, the connection setup message includes one or more of the following:

an RRC connection setup request message; or
an RRC connection setup complete message.

In an embodiment, the resource scheduling request message includes one or more of the following:

a schedule request SR; or
a buffer status report BSR.

Figure 14:
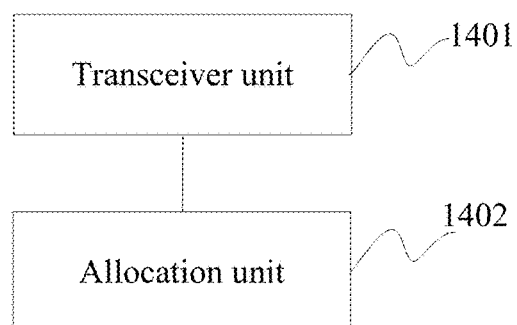
FIG. 14 is a schematic structural diagram of a service processing apparatus according to an embodiment of the present invention.

As shown in FIG. 14, FIG. 14 is a schematic structural diagram of a service processing apparatus according to an embodiment of the present invention.

Referring to FIG. 14, an embodiment of the apparatus includes:

a transceiver unit 1401, configured to receive a resource scheduling request message sent by user equipment UE, where the resource scheduling request message includes voice session indication information, and the voice session indication information is used to indicate that the resource scheduling request message is sent due to a Voice over Long Term Evolution VoLTE voice session; and an allocation unit 1402, configured to preferentially allocate an uplink transmission resource to the UE.

In an embodiment, the allocation unit 1402 is further configured to:

preferentially allocate, within a third time period that is after the resource scheduling request message is received, a downlink transmission resource if a downlink data packet to be sent to the UE is received, and send the downlink data packet to the UE by using the downlink transmission resource.

In an embodiment, the allocation unit 1402 is specifically configured to:

start a third timer after the resource scheduling request message is received, where timing duration of the third timer is the third time period; and preferentially allocate, before the third timer expires, the downlink transmission resource if the downlink data packet to be sent to the UE is received.

In an embodiment, the transceiver unit 1401 is further configured to:

determine that the downlink data packet is transmitted on a VoLTE voice signaling plane bearer, where the VoLTE voice signaling plane bearer is a bearer available for transmission of VoLTE voice session signaling.

In an embodiment, a value of a quality of service class identifier QCI of the VoLTE voice signaling plane bearer is 5.

In an embodiment, the resource scheduling request message includes one or more of the following:

a schedule request SR; or
a buffer status report BSR.

Figure 15:
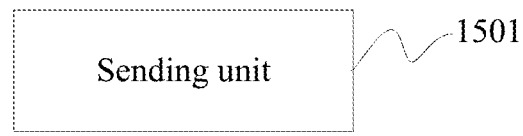
FIG. 15 is a schematic structural diagram of a service processing apparatus according to an embodiment of the present invention.

As shown in FIG. 15, FIG. 15 is a schematic structural diagram of a service processing apparatus according to an embodiment of the present invention.

Referring to FIG. 15, an embodiment of the apparatus includes:

a sending unit 1501, configured to send a resource scheduling request message to an access network device, where the resource scheduling request message includes voice session indication information, and the voice session indication information is used to indicate that the resource scheduling request message is sent due to a Voice over Long Term Evolution VoLTE voice session.

The sending unit 1501 is configured to transmit an uplink data packet according to an uplink transmission resource allocated by the access network device. The uplink transmission resource is preferentially allocated by the access network device to the apparatus after the access network device receives the resource scheduling request message sent by the apparatus.

In an embodiment, the resource scheduling request message includes one or more of the following:
a schedule request SR; or
a buffer status report BSR.

Figure 16:
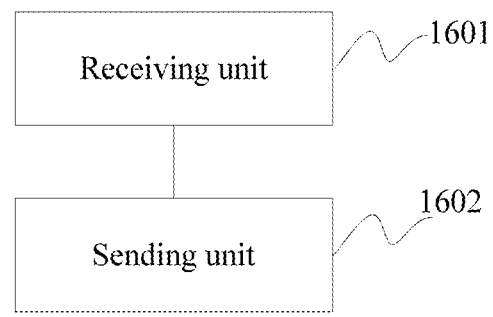
FIG. 16 is a schematic flowchart of a service processing method according to an embodiment of the present invention.

As shown in FIG. 16, FIG. 16 is a schematic structural diagram of a service processing apparatus according to an embodiment of the present invention.

Referring to FIG. 16, an embodiment of the apparatus includes:
a receiving unit 1601, configured to receive a first paging message that is used to page user equipment UE and that is sent by a core network control device, where the first paging message includes first voice session indication information, and the first voice session indication information is used to indicate that the first paging message is sent due to a Voice over Long Term Evolution VoLTE voice session; and
a sending unit 1602, configured to preferentially send a second paging message to the UE, where the second paging message includes second voice session indication information, and the second voice session indication information is used to indicate that the second paging message is sent due to a VoLTE voice session.

In an embodiment, the sending unit 1602 is further configured to:
preferentially process a connection setup message sent by the UE.

In an embodiment, the connection setup message includes one or more of the following:
an RRC connection setup request message; or
an RRC connection setup complete message.

Figure 17:
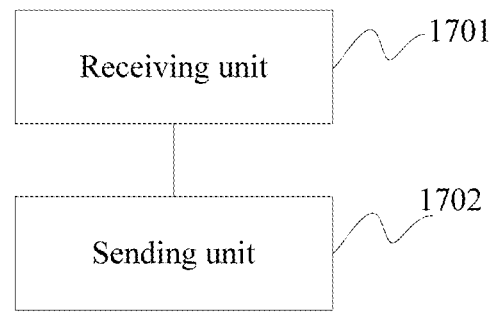
FIG. 17 is a schematic structural diagram of a service processing apparatus according to an embodiment of the present invention.

As shown in FIG. 17, FIG. 17 is a schematic structural diagram of a service processing apparatus according to an embodiment of the present invention.

Referring to FIG. 17, an embodiment of the apparatus includes:
a receiving unit 1701, configured to receive a downlink data notification message sent by a core network gateway device, where the downlink data notification message includes third voice session indication information, and the third voice session indication information is used to indicate that the downlink data notification message is sent due to a Voice over Long Term Evolution VoLTE voice session; and
a sending unit 1702, configured to send a first paging message to an access network device, where the first paging message includes first voice session indication information, and the first voice session indication information is used to indicate that the first paging message is initiated due to a VoLTE voice session.

In an embodiment, the third voice session indication information is in any one of the following fields of the downlink data notification message:
a particular differentiated services code point DSCP, terms of service TOS, a traffic class Traffic Class, a flow label Flow Label, or a field of General Packet Radio Service GPRS Tunneling Protocol that carries the downlink data packet.

Figure 18:
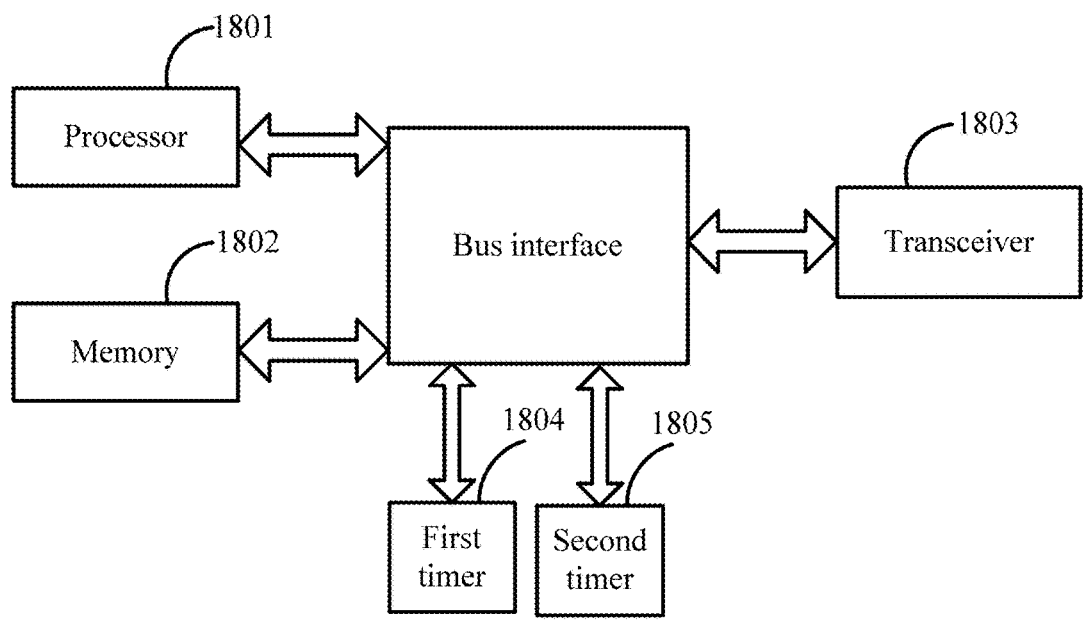
FIG. 18 is a schematic structural diagram of a service processing apparatus according to an embodiment of the present invention.

As shown in FIG. 18, an embodiment of the present invention provides an access network device, including a processor 1801, a memory 1802, and a transceiver 1803.

The transceiver 1803 may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network transceiver, a cellular network transceiver, or a combination thereof. The processor 1801 may be a central processing unit (CPU for short), a network processor (NP for short), or a combination of a CPU and an NP. The processor 1801 may further include a hardware chip. The hardware chip may be an application-specific integrated circuit (ASIC for short), a programmable logic device (PLD for short), or a combination thereof. The PLD may be a complex programmable logic device (CPLD for short), a field-programmable logic gate array (FPGA for short), a generic array logic (GAL for short), or any combination thereof. The memory 1802 may include a volatile memory, for example, a random access memory (RAM for short). The memory 1802 may alternatively include a non-volatile memory, for example, a read-only memory (ROM for short), a flash memory, a hard disk drive (HDD or short), or a solid-state drive (SSD for short). The memory 1802 may alternatively include a combination of the foregoing types of memories.

The memory 1802 is configured to store a received message such as a connection setup message or a resource scheduling request message. The memory 1802 may be further configured to store a program to be read by the processor 1801.

The transceiver 1803 is configured to receive a connection setup message sent by user equipment UE, where the connection setup message includes first voice session indication information, and the first voice session indication information is used to indicate that the connection setup message is sent due to a Voice over Long Term Evolution VoLTE voice session; and is configured to receive a resource scheduling request message sent by the UE.

The processor 1801 is configured to preferentially allocate, within a first time period that is after the connection setup request message is received, an uplink transmission resource to the UE if the transceiver 1803 receives the resource scheduling request message sent by the UE.

In an embodiment, the first voice session indication information is originating voice session indication information used to indicate that the connection setup message is sent due to an originating VoLTE voice session; or
the first voice session indication information is a terminated voice session indication used to indicate that the connection setup message is sent due to a terminated VoLTE voice session.

In an embodiment,
the transceiver 1803 is configured to receive a downlink data packet to be sent to the UE;
the processor 1801 is configured to preferentially allocate, within a second time period that is after the connection setup message is received, a downlink transmission resource if the transceiver 1803 receives the downlink data packet to be sent to the UE; and
the processor 1801 is configured to send the downlink data packet to the UE by using the downlink transmission resource.

In an embodiment, the access network device further includes a first timer 1804.

The processor is configured to start the first timer 1804 after the connection setup request message is received. Timing duration of the first timer 1804 is the first time period.

The processor 1801 is configured to preferentially allocate, before the first timer 1804 expires, the uplink transmission resource to the UE if the transceiver 1803 receives the resource scheduling request message sent by the UE.

In an embodiment, the access network device further includes a second timer 1805.

The processor 1801 is configured to start the second timer 1805 after the connection setup request message is received. Timing duration of the second timer 1805 is the second time period.

The processor 1801 is configured to preferentially allocate, before the second timer 1805 expires, the downlink transmission resource if the transceiver 1803 receives the downlink data packet to be sent to the UE.

In an embodiment, the processor 1801 is specifically configured to:

determine that the downlink data packet is transmitted on a VoLTE voice signaling plane bearer, where the VoLTE voice signaling plane bearer is a bearer available for transmission of VoLTE voice session signaling.

In an embodiment, a value of a quality of service class identifier QCI of the VoLTE voice signaling plane bearer is 5.

In an embodiment, the transceiver 1803 is specifically configured to:

send a paging message to the UE, where the paging message includes second voice session indication information, and the second voice session indication information is used to indicate that the paging message is sent due to a terminated VoLTE voice session.

In an embodiment, the connection setup message includes one or more of the following:

an RRC connection setup request message; or
an RRC connection setup complete message.

In an embodiment, the resource scheduling request message includes one or more of the following:

a schedule request SR; or
a buffer status report BSR.

In FIG. 18, a bus interface may be further included. The bus interface provides an interface. The bus interface may include any quantity of interconnected buses and bridges. The bus interface may further connect a peripheral device and a voltage stabilizer to other circuits such as a power management circuit. These are well known in the art, and therefore are no longer further described in this specification.

Figure 19:
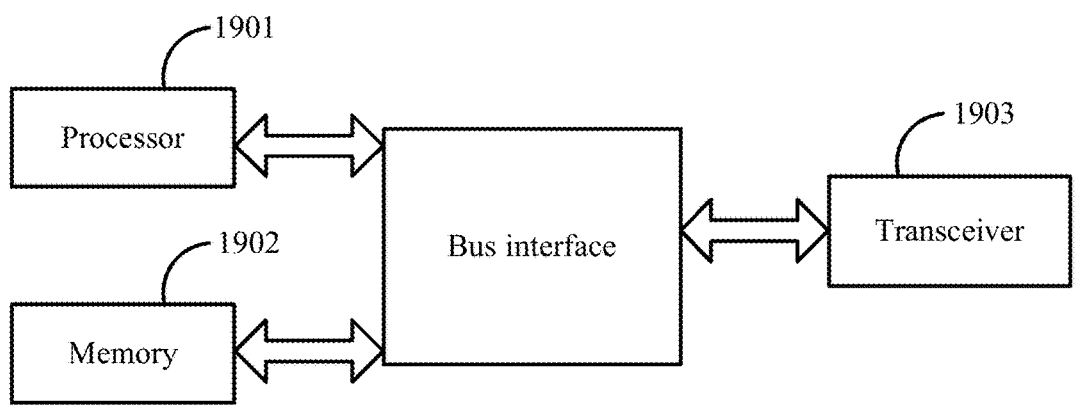
FIG. 19 is a schematic structural diagram of a service processing apparatus according to an embodiment of the present invention.

As shown in FIG. 19, an embodiment of the present invention provides user equipment. The apparatus includes a processor 1901, a memory 1902, and a transceiver 1903.

The transceiver 1903 may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network transceiver, a cellular network transceiver, or a combination thereof. The processor 1901 may be a CPU, an NP, or a combination of a CPU or an NP. The processor 1901 may further include a hardware chip. The hardware chip may be an application-specific integrated circuit ASIC, a PLD, or a combination thereof. The PLD may be a CPLD, an FPGA, GAL, or any combination thereof. The memory 1902 may include a volatile memory, for example, a RAM. The memory 1902 may alternatively include a non-volatile memory, for example, a ROM, a flash memory, an HDD, or an SSD. The memory 1902 may alternatively include a combination of the foregoing types of memories.

The memory 1902 is configured to store a received connection setup message. The memory 1902 may be further configured to store a program to be read by the processor 1901.

The transceiver 1903 is configured to send a connection setup message to an access network device. The connection setup message includes first voice session indication information, and the first voice session indication information is used to indicate that the connection setup message is sent due to a Voice over Long Term Evolution VoLTE voice session.

The transceiver 1903 is configured to: send a resource scheduling request message to the access network device, and transmit an uplink data packet according to an uplink transmission resource allocated by the access network device. The uplink transmission resource is preferentially allocated by the access network device to the UE within a first time period that is after the access network device receives the connection setup message sent by the UE.

In an embodiment, the processor 1901 is configured to determine that an originating VoLTE voice session needs to be set up; and the transceiver 1903 is configured to send the connection setup message to the access network device, where the connection setup message includes originating voice session indication information, and the originating voice session indication information is used to indicate that the connection setup message is sent due to the originating VoLTE voice session; or the processor 1901 is configured to determine that a terminated VoLTE voice session needs to be set up; and the transceiver 1903 is configured to send the connection setup message to the access network device, where the connection setup message includes terminated voice session indication information, and the terminated voice session indication information is used to indicate that the connection setup message is sent due to the terminated VoLTE voice session.

In an embodiment, the transceiver 1903 is configured to receive a paging message sent by the access network device.

The processor 1901 is configured to determine that the paging message includes second voice session indication information.

In an embodiment, the connection setup message includes one or more of the following:

an RRC connection setup request message; or
an RRC connection setup complete message.

In an embodiment, the resource scheduling request message includes one or more of the following:

a schedule request SR; or
a buffer status report BSR.

In FIG. 19, a bus interface may be further included. The bus interface provides an interface. The bus interface may include any quantity of interconnected buses and bridges. The bus interface may further connect a peripheral device and a voltage stabilizer to other circuits such as a power management circuit. These are well known in the art, and therefore are no longer further described in this specification.

Figure 20:
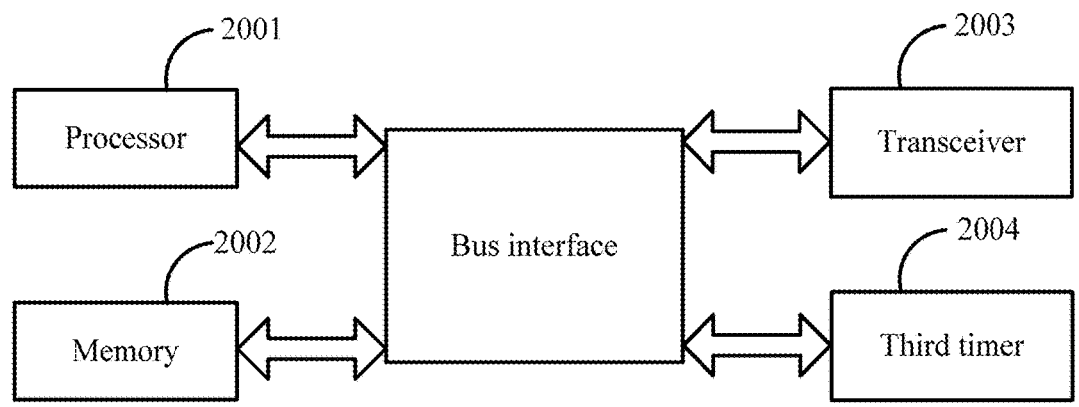
FIG. 20 is a schematic structural diagram of a service processing apparatus according to an embodiment of the present invention.

As shown in FIG. 20, an embodiment of the present invention provides an access network device. The apparatus includes a processor 2001, a memory 2002, and a transceiver 2003.

The transceiver 2003 may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network transceiver, a cellular network transceiver, or a combination thereof. The processor 2001 may be a CPU, an NP, or a combination of a CPU or an NP. The processor 2001 may further include a hardware chip. The hardware chip may be an application-specific integrated circuit ASIC, a PLD, or a combination thereof. The PLD may be a CPLD, an FPGA, GAL, or any combination thereof. The memory 2002 may include a volatile memory, for example, a RAM. The memory 2002 may alternatively include a non-volatile memory, for example, a ROM, a flash memory, an HDD, or an SSD. The memory 2002 may alternatively include a combination of the foregoing types of memories.

The memory 2002 is configured to store a received resource scheduling request message. The memory 2002 may be further configured to store a program to be read by the processor 2001.

The transceiver 2003 is configured to receive a resource scheduling request message sent by user equipment UE. The resource scheduling request message includes voice session indication information, and the voice session indication information is used to indicate that the resource scheduling request message is sent due to a Voice over Long Term Evolution VoLTE voice session.

The processor 2001 is configured to preferentially allocate an uplink transmission resource to the UE.

In an embodiment, the transceiver 2003 is configured to receive a downlink data packet to be sent to the UE;

the processor 2001 is configured to preferentially allocate, within a third time period that is after the resource scheduling request message is received, a downlink transmission resource if the transceiver 2003 receives the downlink data packet to be sent to the UE; and the transceiver 2003 is configured to send the downlink data packet to the UE by using the downlink transmission resource.

In an embodiment, the user equipment further includes a third timer 2004.

The processor 2001 is configured to start the third timer 2004 after the resource scheduling request message is received. Timing duration of the third timer 2004 is the third time period.

The processor 2001 is configured to preferentially allocate, before the third timer 2004 expires, the downlink transmission resource if the transceiver 2003 receives the downlink data packet to be sent to the UE.

In an embodiment, the processor 2001 is specifically configured to:

determine that the downlink data packet is transmitted on a VoLTE voice signaling plane bearer, where the VoLTE voice signaling plane bearer is a bearer available for transmission of VoLTE voice session signaling.

In an embodiment, a value of a quality of service class identifier QCI of the VoLTE voice signaling plane bearer is 5.

In an embodiment, the resource scheduling request message includes one or more of the following:

a schedule request SR; or a buffer status report BSR.

In FIG. 20, a bus interface may be further included. The bus interface provides an interface. The bus interface may include any quantity of interconnected buses and bridges. The bus interface may further connect a peripheral device and a voltage stabilizer to other circuits such as a power management circuit. These are well known in the art, and therefore are no longer further described in this specification.

Figure 21:
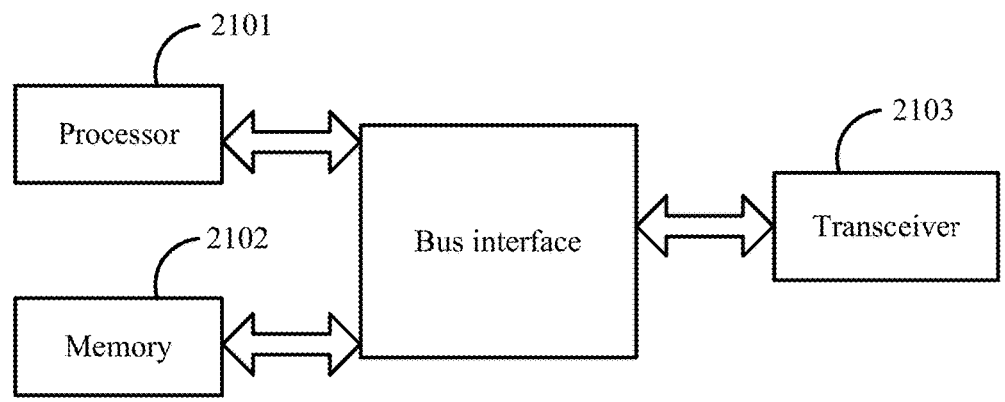
FIG. 21 is a schematic structural diagram of a service processing apparatus according to an embodiment of the present invention.

As shown in FIG. 21, an embodiment of the present invention provides user equipment. The apparatus includes a processor 2101, a memory 2102, and a transceiver 2103.

The transceiver 2103 may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network transceiver, a cellular network transceiver, or a combination thereof. The processor 2101 may be a CPU, an NP, or a combination of a CPU or an NP. The processor 2101 may further include a hardware chip. The hardware chip may be an application-specific integrated circuit ASIC, a PLD, or a combination thereof. The PLD may be a CPLD, an FPGA, GAL, or any combination thereof. The memory 2102 may include a volatile memory, for example, a RAM. The memory 2102 may alternatively include a non-volatile memory, for example, a ROM, a flash memory, an HDD, or an SSD. The memory 2102 may alternatively include a combination of the foregoing types of memories.

The memory 2102 is configured to store a received resource scheduling request message. The memory 2102 may be further configured to store a program to be read by the processor 2101.

The transceiver 2103 is configured to send a resource scheduling request message to an access network device. The resource scheduling request message includes voice session indication information, and the voice session indication information is used to indicate that the resource scheduling request message is sent due to a Voice over Long Term Evolution VoLTE voice session.

The processor 2101 is configured to transmit an uplink data packet according to an uplink transmission resource allocated by the access network device, where the uplink transmission resource is preferentially allocated by the access network device to the UE after the access network device receives the resource scheduling request message sent by the UE.

In an embodiment, the resource scheduling request message includes one or more of the following:

a schedule request SR; or a buffer status report BSR.

In FIG. 21, a bus interface may be further included. The bus interface provides an interface. The bus interface may include any quantity of interconnected buses and bridges. The bus interface may further connect a peripheral device and a voltage stabilizer to other circuits such as a power management circuit. These are well known in the art, and therefore are no longer further described in this specification.

Figure 22:
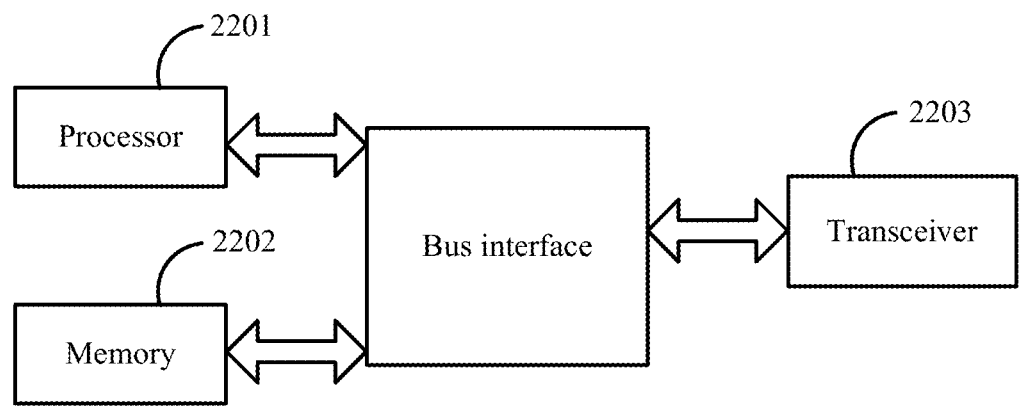
FIG. 22 is a schematic structural diagram of a service processing apparatus according to an embodiment of the present invention.

As shown in FIG. 22, an embodiment of the present invention provides an access network device. The apparatus includes a processor 2201, a memory 2202, and a transceiver 2203.

The transceiver 2203 may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network transceiver, a cellular network transceiver, or a combination thereof. The processor 2201 may be a CPU, an NP, or a combination of a CPU or an NP. The processor 2201 may further include a hardware chip. The hardware chip may be an application-specific integrated circuit ASIC, a PLD, or a combination thereof. The PLD may be a CPLD, an FPGA, GAL, or any combination thereof. The memory 2202 may include a volatile memory, for example, a RAM. The memory 2202 may alternatively include a non-volatile memory, for example, a ROM, a flash memory, an HDD, or an SSD. The memory 2202 may alternatively include a combination of the foregoing types of memories.

The memory 2202 is configured to store a received first paging message. The memory 2202 may be further configured to store a program to be read by the processor 2201.

The transceiver 2203 is configured to receive a first paging message that is used to page user equipment UE and that is sent by a core network control device. The first paging message includes first voice session indication information, and the first voice session indication information is used to indicate that the first paging message is sent due to a Voice over Long Term Evolution VoLTE voice session.

The transceiver 2203 is configured to preferentially send a second paging message to the UE. The second paging message includes second voice session indication information, and the second voice session indication information is used to indicate that the second paging message is sent due to a VoLTE voice session.

In an embodiment, the processor 2201 is specifically configured to:

preferentially process a connection setup message sent by the UE.

In an embodiment, the connection setup message includes one or more of the following:

an RRC connection setup request message; or an RRC connection setup complete message.

In FIG. 22, a bus interface may be further included. The bus interface provides an interface. The bus interface may include any quantity of interconnected buses and bridges. The bus interface may further connect a peripheral device and a voltage stabilizer to other circuits such as a power management circuit. These are well known in the art, and therefore are no longer further described in this specification.

Figure 23:
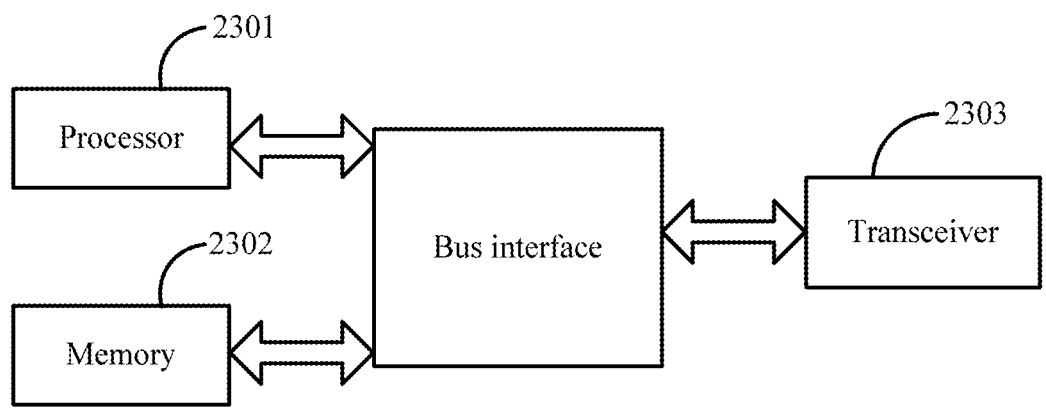
FIG. 23 is a schematic structural diagram of a service processing apparatus according to an embodiment of the present invention.

As shown in FIG. 23, an embodiment of the present invention provides a core network control device. The apparatus includes a processor 2301, a memory 2302, and a transceiver 2303.

The transceiver 2303 may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network transceiver, a cellular network transceiver, or a combination thereof. The processor 2301 may be a CPU, an NP, or a combination of a CPU or an NP. The processor 2301 may further include a hardware chip. The hardware chip may be an application-specific integrated circuit ASIC, a PLD, or a combination thereof. The PLD may be a CPLD, an FPGA, GAL, or any combination thereof. The memory 2302 may include a volatile memory, for example, a RAM. The memory 2302 may alternatively include a non-volatile memory, for example, a ROM, a flash memory, an HDD, or an SSD. The memory 2302 may alternatively include a combination of the foregoing types of memories.

The memory 2302 is configured to store a received downlink data notification message. The memory 2302 may be further configured to store a program to be read by the processor 2301.

The transceiver 2303 is configured to receive a downlink data notification message sent by a core network gateway device. The downlink data notification message includes third voice session indication information, and the third voice session indication information is used to indicate that the downlink data notification message is sent due to a Voice over Long Term Evolution VoLTE voice session.

The transceiver 2303 is configured to send a first paging message to an access network device. The first paging message includes first voice session indication information, and the first voice session indication information is used to indicate that the first paging message is initiated due to a VoLTE voice session.

In an embodiment, the third voice session indication information is in any one of the following fields of the downlink data notification message:

a particular differentiated services code point DSCP, terms of service TOS, a traffic class Traffic Class, a flow label Flow Label, or a field of General Packet Radio Service GPRS Tunneling Protocol that carries the downlink data packet.

In FIG. 23, a bus interface may be further included. The bus interface provides an interface. The bus interface may include any quantity of interconnected buses and bridges. The bus interface may further connect a peripheral device and a voltage stabilizer to other circuits such as a power management circuit. These are well known in the art, and therefore are no longer further described in this specification.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine instruction, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the present invention without departing from the scope of the present invention. The present invention is intended to cover these modifications and variations provided that they fall within the scope of protection defined by the following claims.

What is claimed is:

1. A service processing method, wherein the method comprises:
    sending, by user equipment (UE), a connection setup message to an access network device, wherein the connection setup message comprises first voice session indication information that indicates that the connection setup message is sent due to a Voice over Long Term Evolution (VoLTE) voice session; and
    sending, by the UE, a resource scheduling request message to the access network device, and transmitting an uplink data packet according to an uplink transmission resource allocated by the access network device, wherein the uplink transmission resource is allocated by the access network device to the UE when the resource scheduling request message is received by the access network device within a first time period that is associated with a setup duration of a VoLTE voice session after the access network device receives the connection setup message sent by the UE.

2. The method according to claim 1, wherein the sending, by user equipment UE, a connection setup message to an access network device, wherein the connection setup message comprises first voice session indication information that indicates that the connection setup message is sent due to a VoLTE voice session, comprises:
    sending, by the UE, the connection setup message to the access network device, wherein the connection setup message comprises originating voice session indication information that indicates that the connection setup message is sent due to the originating VoLTE voice session.

3. The method according to claim 2, before the sending, by the UE, the connection setup message to the access network device, further comprising:
    receiving, by the UE, a paging message sent by the access network device; and
    determining, by the UE, that the paging message comprises second voice session indication information.

4. The method according to claim 1, wherein the sending, by user equipment UE, a connection setup message to an access network device, wherein the connection setup message comprises first voice session indication information that indicates that the connection setup message is sent due to a VoLTE voice session, comprises:
    sending, by the UE, the connection setup message to the access network device, wherein the connection setup message comprises terminated voice session indication information that indicates that the connection setup message is sent due to the terminated VoLTE voice session.

5. The method according to claim 1, wherein the connection setup message comprises one or more of the following:
    an radio resource control (RRC) connection setup request message; or
    an RRC connection setup complete message.

6. The method according to claim 1, wherein the resource scheduling request message comprises one or more of the following:
    a schedule request (SR); or
    a buffer status report (BSR).

7. An access network device, comprising:
    a transceiver, configured to receive a connection setup message sent by user equipment (UE), wherein the connection setup message comprises first voice session indication information that indicates that the connection setup message is sent due to a Voice over Long Term Evolution (VoLTE) voice session; and configured to receive a resource scheduling request message sent by the UE; and
    a processor, configured to allocate an uplink transmission resource to the UE if the transceiver receives the resource scheduling request message sent by the UE within a first time period that is associated with a setup duration of a VOLTE voice session after the connection setup message is received.

8. The access network device according to claim 7, wherein
    the transceiver is configured to receive a downlink data packet to be sent to the UE;
    the processor is configured to allocate, within a second time period that is after the connection setup message is received, a downlink transmission resource if the transceiver receives the downlink data packet to be sent to the UE; and
    the processor is configured to send the downlink data packet to the UE by using the downlink transmission resource.

9. The access network device according to claim 7, wherein the access network device further comprises a first timer;
    the processor is configured to start the first timer after the connection setup message is received, wherein timing duration of the first timer is the first time period; and
    the processor is configured to allocate, before the first timer expires, the uplink transmission resource to the UE if the transceiver receives the resource scheduling request message sent by the UE.

10. The access network device according to claim 7, wherein the access network device further comprises a second timer;
    the processor is configured to start the second timer after the connection setup message is received, wherein timing duration of the second timer is the second time period; and
    the processor is configured to allocate, before the second timer expires, the downlink transmission resource if the transceiver receives the downlink data packet to be sent to the UE.

11. The access network device according to claim 7, wherein the processor is configured to:
    determine that the downlink data packet is transmitted on a VoLTE voice signaling plane bearer, wherein the VoLTE voice signaling plane bearer is a bearer available for transmission of VoLTE voice session signaling.

12. The access network device according to claim 7, wherein the transceiver is configured to:
    send a paging message to the UE, wherein the paging message comprises second voice session indication information that indicates that the paging message is sent due to a terminated VoLTE voice session.

13. The access network device according to claim 7, wherein a value of a quality of service class identifier (QCI) of the VoLTE voice signaling plane bearer is 5.

14. The access network device according to claim 7, wherein the connection setup message comprises one or more of the following:
   an radio resource control (RRC) connection setup request message; or
   an RRC connection setup complete message.

15. The access network device according to claim 7, wherein the resource scheduling request message comprises one or more of the following:
   a schedule request (SR); or
   a buffer status report (BSR).

16. User equipment (UE), comprising:
   a transceiver, configured to send a connection setup message to an access network device, wherein the connection setup message comprises first voice session indication information that indicates that the connection setup message is sent due to a Voice over Long Term Evolution (VoLTE) voice session; wherein
   the transceiver is configured to: send a resource scheduling request message to the access network device, and transmit an uplink data packet according to an uplink transmission resource allocated by the access network device, wherein the uplink transmission resource is allocated by the access network device to the UE when the resource scheduling request message is received by the access network device within a first time period that is associated with a setup duration of a VoLTE voice session after the access network device receives the connection setup message sent by the UE.

17. The user equipment according to claim 16, wherein the user equipment further comprises a processor, wherein
   the processor is configured to determine that an originating VoLTE voice session needs to be set up; and
   the transceiver is configured to send the connection setup message to the access network device, wherein the connection setup message comprises originating voice session indication information that indicates that the connection setup message is sent due to the originating VoLTE voice session.

18. The user equipment according to claim 17, wherein
   the transceiver is configured to receive a paging message sent by the access network device; and
   the processor is configured to determine that the paging message comprises second voice session indication information.

19. The user equipment according to claim 16, wherein the user equipment further comprises a processor, wherein
   the processor is configured to determine that a terminated VoLTE voice session needs to be set up; and
   the transceiver is configured to send the connection setup message to the access network device, wherein the connection setup message comprises terminated voice session indication information that indicates that the connection setup message is sent due to the terminated VoLTE voice session.

* * * * *